(12) United States Patent
Sadowski et al.

(10) Patent No.: US 12,248,893 B2
(45) Date of Patent: Mar. 11, 2025

(54) SYSTEMS AND METHODS FOR INTELLIGENT MONITORING

(71) Applicant: Foundever Operating Corporation, Miami, FL (US)

(72) Inventors: Richard Sadowski, Tampa, FL (US); J. Shelton Hook, Jr., Tampa, FL (US); David Pearson, Tampa, FL (US); Stephen Berdy, Tampa, FL (US); Joseph Flaska, Tampa, FL (US); Eric G. Palacio, Tampa, FL (US); J. Brooke Aker, Tampa, FL (US); Martin Hendrickse, Tampa, FL (US); John Romania, Tampa, FL (US); John Farley, Tampa, FL (US)

(73) Assignee: FOUNDEVER OPERATING CORPORATION, Miami, FL (US)

( * ) Notice: Subject to any disclaimer, the term of this patent is extended or adjusted under 35 U.S.C. 154(b) by 489 days.

(21) Appl. No.: 17/471,002

(22) Filed: Sep. 9, 2021

(65) Prior Publication Data

US 2021/0406806 A1 Dec. 30, 2021

Related U.S. Application Data

(63) Continuation-in-part of application No. 16/938,537, filed on Jul. 24, 2020, and a continuation-in-part of
(Continued)

(51) Int. Cl.
*G06Q 10/0631* (2023.01)
*G06F 21/31* (2013.01)
(Continued)

(52) U.S. Cl.
CPC ..... *G06Q 10/063114* (2013.01); *G06F 21/31* (2013.01); *G06F 21/51* (2013.01);
(Continued)

(58) Field of Classification Search
CPC ........................ G06Q 10/063114; G06V 20/52
See application file for complete search history.

(56) References Cited

U.S. PATENT DOCUMENTS

| 6,047,060 A * | 4/2000 | Fedorov ................. H04M 3/51 379/267 |
| 9,014,364 B1 * | 4/2015 | Koster ............. H04M 3/42059 379/88.01 |

(Continued)

*Primary Examiner* — Kannan Shanmugasundaram
(74) *Attorney, Agent, or Firm* — Shumaker, Loop & Kendrick, LLP; Jeffrey B. Fabian

(57) ABSTRACT

Disclosed are systems and methods that enable robust, universal authentication and network access control capabilities for networks having a variety of computing device types and end users that access and operate on the network. The systems permit verification of end user identity, confirmation that computing devices have sufficient resources to reliably operate on the network, and configuration of computing devices with required software applications. The systems and methods further enable real-time, intelligent monitoring of the tasks and functions performed by system end users. The systems provide an immersive experience that allows end users to teleport into the environment of other end users, including viewing another end user's computer desktop, listening to ongoing telephone conversations, viewing and analyzing contemporaneous images or video of an end user and the end user's work environment, and interacting with the end user to provide precision coaching and assistance.

9 Claims, 10 Drawing Sheets

Related U.S. Application Data application No. 16/908,280, filed on Jun. 22, 2020, now Pat. No. 11,699,113.

(60) Provisional application No. 63/212,813, filed on Jun. 21, 2021.

(51) Int. Cl.
  *G06F 21/51* (2013.01)
  *G06T 7/73* (2017.01)
  *G06V 20/52* (2022.01)

(52) U.S. Cl.
  CPC ............... *G06T 7/73* (2017.01); *G06V 20/52* (2022.01); *G06F 2221/2111* (2013.01); *G06F 2221/2141* (2013.01)

(56) References Cited

U.S. PATENT DOCUMENTS

| | | | |
|---|---|---|---|
| 9,106,736 B1 * | 8/2015 | Slovacek | H04M 3/36 |
| 9,178,998 B2 | 11/2015 | O'Connor | |
| 2003/0091028 A1 | 5/2003 | Chang | |
| 2008/0019500 A1 * | 1/2008 | Torres | H04M 3/5237 |
| | | | 379/265.02 |
| 2009/0013255 A1 * | 1/2009 | Yuschik | G06F 3/048 |
| | | | 715/728 |

\* cited by examiner

SYSTEMS AND METHODS FOR INTELLIGENT MONITORING

CROSS REFERENCE TO RELATED APPLICATION

This application claims priority from U.S. provisional application No. 63/212,813 filed Jun. 21, 2021, the entirety of which is incorporated herein by reference. This application also claims priority from U.S. patent application Ser. No. 16/938,537 titled "Adaptive Workshop Environment" filed Jul. 24, 2020, the entirety of which is incorporated herein by reference and U.S. patent application Ser. No. 16/908,280 titled "Systems and Methods for Digital Analysis Test, and Improvement of Customer Experience" filed Jun. 22, 2020, the entirety of which is incorporated herein by reference.

TECHNICAL FIELD AND BACKGROUND

The present invention relates generally to the field of intelligent, real-time electronic monitoring of system end users. More particularly, the present invention relates to systems and methods for controlling end user computing device access to a network, configuring end user computing devices, analyzing computing resource availability, and monitoring real-time activity of end user computing devices on a network.

Conventional methods for monitoring system end users are reactive, rely on limited subsets of data and information, and are poorly adapted to hybrid work forces where some end users work from an office while others work remotely or in the field. To illustrate with respect to a call center where agents are tasked with providing customer support, supervisors are frequently called upon to assist only after a problem has arisen with a customer. Further, supervisors have limited access to real-time data and information that reveal what tasks and functions the agents are performing. Supervisors may only know whether agents are on a call or not, and reviewing agent performance is limited to listening to an audio recording of a customer interaction. This limited access to information in turn limits a supervisor's ability to assist agents or be proactive in addressing problems before they occur.

For hybrid workforces, access to information about agent and other end user activity is even more limited as supervisors have little or no insight into an agent's work environment and no ability to observe agent performance in person. End users in a hybrid workforce may also access a network using varying types of computing devices, software applications, or account types, which presents additional challenges for an enterprise that is managing access to a network. Some end users might utilize enterprise-issued computing devices that are preconfigured to facilitate secure, reliable access to a network and proper operation within a network. However, other end users might use personally-owned computing devices that require user names and passwords unknown to a network and that are not configured with required software and security features, thereby presenting barriers for authenticating end users and ensuring end user computing devices are properly configured for operating within the network.

Considering the foregoing limitations of current methods for monitoring end users, it is an objective of the present invention to provide robust, adaptable, systems and methods for controlling access to a network and configuring a variety of computing device types to ensure secure, reliable network access and operation within the network. It is a further objective of the present invention to provide systems and methods that enable real-time intelligent monitoring of the tasks and functions performed by system end users. In one aspect of the invention, the system provides an immersive experience that allows end users to teleport into the work environment of other end users, including viewing the end user's computer desktop, listening to ongoing telephone conversations, viewing and analyzing contemporaneous images or video of an end user and the end user's work environment, and interacting with the end user to provide precision coaching and assistance.

SUMMARY

In one embodiment of the inventive systems and methods disclosed in this specification, a provider network includes an Adaptive Workspace System having Adaptive Workspace software code that generates an Adaptive Workspace System ("AWS") Intelligent Monitor interface. The AWS Intelligent Monitor interface is displayed on a first end user's computing device and includes a screen function and a listen function, which are implemented as selectable inputs on a graphical user interface ("GUI"). The screen function and listen function can optionally be combined into a single input, such as a button on a GUI.

The screen and listen functions initiate the streaming of video data and audio data from another end user computing device on the network that is referred to as the "target end user computing device" or "target computing device." The video data shows the desktop display screen of the target end user computing device so that the first end user viewing the AWS Intelligent Monitoring interface can see what the target end user is doing on his or her computer. The audio data can be generated by an ongoing telephone conversation between the target end user and another person, such as a customer to whom the target end user is rendering customer service.

When the first end user selects the screen function, a screen data request message is transmitted to a DIAVA Hub. The DIAVA Hub can be implemented by software running on a physical or virtual computing device, which can be a network device such as a server. The screen data request message includes a target end user computing device identifier that allows the DIAVA Hub to properly route data and information to the target end user computing device on a network. The DIAVA Hub utilizes the target end user computing device identifier to transmit a screen share command to the target end user computing device.

When the first end user selects the listen function, a request to listen message is transmitted to the DIAVA Hub. The request to listen message include the target end user computing device identifier, and the DIAVA Hub utilizes the target end user computing device identifier to transmit an audio stream command to the target end user computing device.

After selecting the screen function, the Adaptive Workspace software code receives video data captured by an Agent Desktop DIAVA Client software application running on the target end user computing device. The video data includes end user screen data showing the target end user computing device display screen or desktop. The Adaptive Workspace software code also receives audio data captured by the Agent Desktop DIAVA Client software application. The Adaptive Workspace software code displays the video data on the AWS Intelligent Monitor interface. The first end user computing device also plays the audio data through a speaker device, such as a computer speaker, phone speaker, or a headset worn by the first end user. Playing the audio data allows the first end user to hear an ongoing telephone conversation involving the target end user.

In one aspect of the invention, the AWS Intelligent Monitor interface can simultaneously display up to six different desktop screens of other system end users. Thus, the AWS Intelligent Monitor interface incorporates a second, third, fourth, fifth, and sixth screen function that are each selectable by the first end user. When the first end user selects the second, third, fourth, fifth, and sixth screen functions, the first end user computing device transmits a second, third, fourth, fifth, and sixth screen data request message to the DIAVA Hub. Each of the screen data request messages includes a distinct target end user computing device identifier that is used by the DIAVA Hub to route a second, third, fourth, fifth, and sixth screen share command to corresponding second, third, fourth, fifth, and sixth target end user computing devices.

After selecting the screen functions, the Adaptive Workspace software code receives video data captured by a second, third, fourth, fifth, and sixth Agent Desktop DIAVA Client software application running on the corresponding second, third, fourth, fifth, and sixth target end user computing devices. The video data includes end user screen data that is displayed on the AWS Intelligent Monitor interface. Thus, the first end user can see the desktop displays for the corresponding second, third, fourth, fifth, and sixth target end user computing devices. The video data showing the desktop displays can be shown in agent blackboards rendered on the AWS Intelligent Monitor interface, as illustrated in the example AWS Intelligent Monitor interface shown in FIG. 5.

Conventional methods for capturing audio data from ongoing telephone calls rely on interfacing with an Automated Call Distribution system, which can be challenging, time consuming, and expensive. Further, ACDs have technical limitations that preclude certain functions, such as streaming audio data from a call to multiple system end users. The present inventive systems and methods overcome problems associated with ACDs in part by utilizing the Agent Desktop DIAVA Client software application to capture audio data from a data port integrated with the target end user computing device. The audio data can be, for example, a universal serial bus ("USB") port.

To efficiently utilize network bandwidth, avoid echo effects, and facilitate transcription of telephone conversations, the audio data can be transmitted through single audio data channels. That is, rather than utilizing the right and left channels of various microphones and headsets, the system uses only the right or the left channel to transmit audio data. Each of the left or right channels is dedicated to transmitting the voice of a single speaker. This avoids unwanted feedback (which causes the echo effect) when multiple end users are speaking on a call, and it enables a "whisper" function where one system user can speak without being heard by other participants in a telephone conversation.

The use of the data port and separation of audio channels is referred to as "Tune-In" technology. The Tune-In technology is implemented in part by the Agent Desktop DIAVA Client software application, which separates audio data into (i) a first audio data channel comprising audio data generated by the target end user speaking into a microphone device connected to the target end user computing device, and (ii) a second audio data channel comprising audio data that is fed to a speaker device connected to the target end user computing device and generated by a remote person speaking (i.e., a customer on the phone with the target end user).

The whisper feature is implemented by including a whisper function or button on the AWS Intelligent Monitor interface. When the first end user selects the whisper function and speaks into a microphone device, the first end user computing device transmits audio data to the target end user computing device. The audio data is transmitted through a single audio data channel of the first end user microphone device (i.e., the left or right channel), and the audio data is received by a single audio data channel of a speaker device connected to the target computing device, such as a telephone headset worn by the target end user.

The Tune-In technology allows for real time streaming of audio data across a network and is described with reference to the following example embodiment. Audio data streaming is initiated when the first end user computing device transmits a request to listen message to the DIAVA Hub. The request to listen message includes a target end user computing device identifier used by the DIAVA Hub to route an audio stream command to the target end user computing device. Receipt of the stream command causes the Agent Desktop DIAVA Client software application to capture audio data from a data port integrated with the target end user computing device.

The Agent Desktop DIAVA Client software application separates the audio data into two channels: (i) a first audio data channel that comprises target end user audio data generated by the target end user speaking into a microphone device, and (ii) a second audio data channel that comprises remote person audio data that is fed to a speaker connected to the target end user computing device and that is generated by the remote person speaking.

After the audio data is separated into two channels, the target end user computing device transmits audio data through the two audio data channels to a live stream service that handles distribution of the audio data to end user computing devices on the network. In particular, the target end user audio data is transmitted to the live service through the first audio data channel, and the remote person audio data is transmitted to the live stream service through the second audio data channel.

The live stream service transmits the audio data to the first end user computing device that requested the streaming. The target end user audio data is transmitted to a first channel of an end user speaker device (i.e., a left or right channel of a telephone headset worn by the first end user), and the remote person audio data is transmitted to a second channel of the end user speaker device.

When the first end user speaks to the target end user using the whisper function, "new" audio data is generated by the first end user speaking into a microphone. The new audio data is sent from the first end user computing device to the target end user computing device. The new audio data is transmitted through a single audio data channel of the first end user's microphone, and the new audio data is received by a single audio data channel of a speaker device connected to the target computing device (i.e., the right or left channel of a telephone headset worn by the target end user).

In yet another aspect of the disclosed systems and methods, access to a network is controlled by identifying or authenticating end users attempting to access a network and verifying that the end user computing devices have sufficient computing resources to facilitate reliable access to the network and operation within the network. Further, the end user computing devices can be configured with appropriate software applications to facilitate network access control and operation within a network. The disclosed systems and methods are robust and are configured to accommodate a variety of computing device types and configurations and end user account types.

The network access control and computing device configuration is managed by a OneTeam Agent technology framework that is implemented in part by an OT Agent software application installed on the end user computing devices. The OT Agent software application analyzes the end user computing devices and interfaces with a DI Software Inventory Database to ensure that an initial suite of machine software is updated and installed on the end user computing device. The initial machine software performs network access control functionality, including end user and end user computing device identification and authentication, resource verification, and computing device configuration.

Once network access control is achieved, a Digital Insights Launcher ("DI Launcher") software application ensures that the end user computing device is configured with updated operational software that is used to access and operate within a network. The operational software can be customized according to attributes of the system end users so that various types of end users have the operational software resources necessary to accomplish the end user's given job functions or objectives. Further, system end users are not provided with access to operational software resources that the end users do not need, which facilitates network security by mitigating the risk of unauthorized access to sensitive or confidential information.

In one embodiment, implementing the OneTeam Agent technology framework includes analyzing an end user computing device by a DI Identity software application to generate endpoint authentication data. The endpoint authentication data is generated from various artifacts of information stored to the end user computing device, such as log files, software files, or hardware identifiers, among other sources of information. An Access Enrichment Ruleset software application performs an identity analysis using the endpoint authentication data to identify the system end user. The system could optionally use the identity analysis results to grant or deny access to the system and send an access notification to other system components.

The DI Launcher installed on the end user computing device performs an operational software inventory check that generates operational software inventory data. The operational software inventory data includes, for example, a list of available operational software applications that are installed on the end user computing device as well as version data indicating the version of the operational software applications that are installed.

The end user computing device transmits the operational software inventory data to a DI Software Inventory Database API that interfaces with a database storing the most current versions of the operational software and initial machine software available for download by the end user computing device. The DI Software Inventory Database API performs an operational software configuration analysis using the operational software inventory data. The operational software configuration analysis identifies operational software that should be sent to, and installed on, the end user computing device as well as whether updates to the operational software are available for the existing operational software already installed on the end user computing device.

The selection of operational software applications installed on the end user computing device can be configured according to the attributes of a system end user. That is, certain system end users may require different operational software applications to perform a given job function. Once an end user is identified, the end user identity can be passed to a directory database API that returns end user attribute data. The DI Software Inventory Database API utilizes the end user attribute data to retrieve a list of required operational software applications from a software inventory database. The operational software configuration analysis includes comparing the operational software inventory data received from the DI Launcher against the list of required operational software applications to determine what operational software or updates should be transmitted to, and installed by, the end user computing device.

With respect to the initial configuration of machine software, the OT Agent software application performs an initial machine software inventory check that generates initial machine software inventory data. The initial machine software inventory data includes a machine software installation indicator and version data for each initial machine software application installed on the end user computing device. The machine software installation indicator is used to determine which of the initial machine software applications are installed on the end user computing devices and which of the initial machine software applications need to be installed.

The end user computing device transmits the initial machine software inventory data to the DI Software Inventory Database API, and the DI Software Inventory Database API performs an initial configuration analysis using the initial machine software inventory data. The initial configuration analysis identifies initial machine software that should be sent to, and installed on, the end user computing device as well as whether updates to the operational software are available for the existing operational software already installed on the end user computing device.

As part of the identity analysis, the system can utilize the end user computing device Internet Protocol Address ("IP Address") to determine whether the end user computing device is located within an expected geographic area. The current IP address for the end user computing device is captured as part of the end user authentication data. The end user computing device IP Address is passed to an Identity & Location API that uses the IP Address to determine geographic IP data indicating an approximate geographic location for the IP Address and end user computing device.

In some cases, the end user may be known to typically access the network from a given geographic area. The system can include predefined thresholds around the known geographic area. If the geographic IP data falls outside of the geographic IP threshold, then access to the network is denied. The system generates an access indicator representing that network access is denied. On the other hand, if the geographic IP data is within the geographic IP threshold, then access to the network is granted. The system then generates an access indicator representing that network access is permitted.

The system can also accomplish network monitoring and control by verifying that the end user computing device has sufficient computing resources to access and operate within the network and run the required software applications. Computing device resources can refer to end user computing device processing speed, memory, storage, and network connection speed and quality, among other metrics.

In one embodiment, a Visualware software application performs a connection quality test that generates connection quality data. The Access Enrichment Ruleset software application performs a resource availability analysis using the connection quality test data. The resource availability analysis compares the connection quality data against a connection quality threshold. The results of the threshold comparison can optionally be used to determine whether the end user computing device has sufficient connection quality to download and install the required operational software for end users to accomplish given functions. The results of the comparison can also optionally be used to grant or deny access to the network. For instance, if the connection quality data does not meet the connection quality threshold, then access to the network is denied, and the system could generate an access indicator representing that network access is denied. On the other hand, if the connection quality data meets the connection quality threshold, then access to the network can granted, and the system generates an access indicator representing that network access is permitted.

In another aspect of the invention, a DI Endpoint Analytics API software application, performs a computing resource analysis that generates device resource data, such metrics relating to processor, memory, or storage utilization and performance. The device resource data can be utilized to monitor end user computing device and network performance, to determine whether and end user computing device has sufficient computing resources to download and run required operational software, or to control access to the network. In one embodiment, the Access Enrichment Ruleset software application performs a resource availability analysis using the device resource data. The resource availability analysis compares the device resource data against a device resource threshold. If the device resource data does not meet the device resource threshold, then the system may generate and alert, the DI Launcher may not download the required operational software or access to the network could be denied. The system optionally generates an access indicator representing that network access is denied. On the other hand, if the device resource data meets the device resource threshold, then access to the network could be granted, and the system generates an access indicator representing that network access is permitted.

The system can also utilize image recognition techniques to identify and authenticate system end users. A camera connected to the end user computing device is used to capture an image of the end user's face, which is stored as camera data. The camera data is captured as part of the endpoint authentication data. The identity analysis performed by the Access Enrichment Ruleset software application includes employing facial recognition image processing techniques to compare the camera data against stored image data depicting the face of the system end user. If the camera data matches to the stored image data, then access to the network is granted. The system generates an access indicator representing that network access is granted. On the other hand, if the camera data does not match the stored image data, then access to the network is denied. The system then generates an access indicator representing that network access is denied.

The camera data is also used to implement compliance monitoring functionality. Event data generated by the end user computing device is used to determine the functions and activities performed by the end user computing device. When the event data indicates that certain higher risk activities are occurring, the camera is used to capture an image or video (i.e., camera data) of the system end user and the system end user's physical work environment. The camera data is analyzed to determine potential compliance violations, such as the presence of an unauthorized person or object in the system end user's environment.

To implement compliance monitoring, a rules engine software application analyzes the event data to recognize the presence of a Trigger Parameter. When a Trigger Parameter is recognized, an image capture instruction is transmitted to a Digital Insights Webcam Agent software application installed on an end user computing device. The Digital Insights Webcam Agent software application activates a camera device connected to the end user computing device to generates camera data.

Video & Image Recognition software is used to analyze the camera data and generate image analysis results data. An image Orchestration API software application analyzes the image analysis results data to detect the presence of a compliance violation. If a compliance violation is detected, the Image Orchestration API generates an alert event. The Trigger Parameter can be, for instance, event data generated by the end user computing device when the end user computing device is used to display sensitive customer information, such as a social security number, medical information, or financial information. A compliance violation could be image analysis results data showing two persons in the end user's physical work environment.

BRIEF DESCRIPTION OF THE DRAWINGS

Features, aspects, and advantages of the present invention are better understood when the following detailed description of the invention is read with reference to the accompanying figures described as follows.

FIG. 6 is an example Shared Experience Review graphical user interface.

FIG. 9 is an example Camera Review graphical user interface.

DETAILED DESCRIPTION

Figure 1:
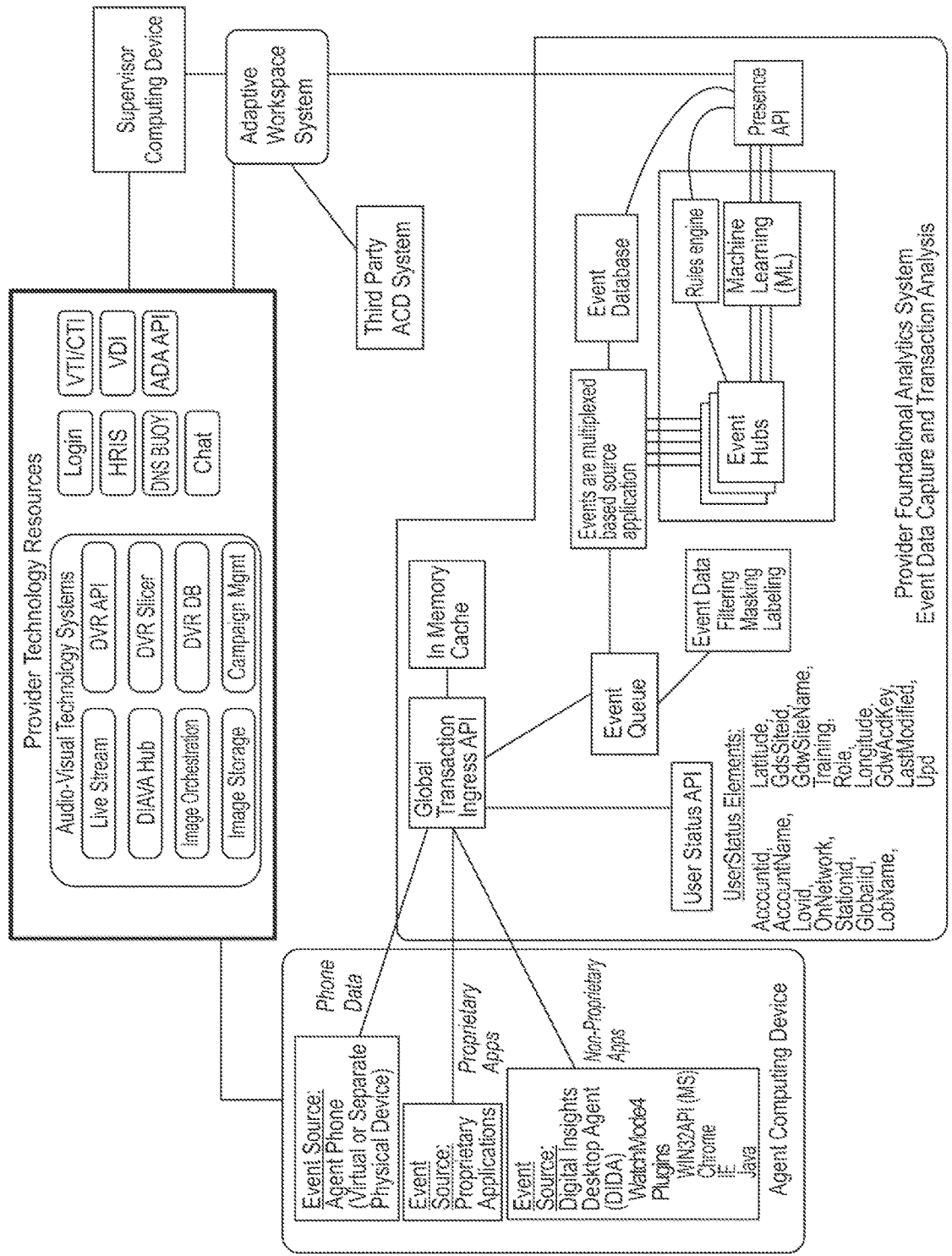
FIG. 1 is an example provider system diagram according to one embodiment.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use, and practice the invention.

It will be understood that relative terms are intended to encompass different orientations or sequences in addition to the orientations and sequences depicted in the drawings and described herein. Relative terminology, such as "substantially" or "about," describe the specified devices, materials, transmissions, steps, parameters, or ranges as well as those that do not materially affect the basic and novel characteristics of the claimed inventions as whole as would be appreciated by one of ordinary skill in the art. The nomenclature utilized to designate various devices and software applications is not intended to be limiting, and reference to a device or application with a particular commercial, proprietary, or other name can be construed to encompass other devices and applications that perform a similar function or have a similar structure.

As used herein, the term provider generally describes the person or entity providing services, such as customer support. The term "customer support" is used interchangeably with the terms support, customer service, customer interaction, or "shared experience" and generally includes, but is not limited to, providing customers with assistance in utilizing existing products and services and with purchasing additional products and services. The term "client" is used to generally denote a separate business entity from the service provider. Customers of the client are provided support by the service provider on behalf of the client; in other words, the provider is operating as a third-party provider of customer support services for the client.

The term "agent" generally describes an individual who interfaces with the customer to provide customer support using the systems and methods described herein, and the term is used interchangeably with the terms end user, user, associate, or representative. The term "supervisor" generally denotes provider personnel with managerial responsibility over one or more agents, who has broader permissions or access rights to the systems, tools, and features, described herein, and who is tasked with monitoring and assisting with agent performance of customer service activities. The term "end user" is used to describe an agent, supervisor, or other provider personnel that utilizes the disclosed systems and methods.

The term "end user computing device" refers to a virtual (e.g., a virtual desktop) or physical computing device (e.g., a desktop personal computer, a laptop, or tablet, etc.) that is used by an agent, supervisor, or other provider personnel to access and use the systems, and perform the inventive methods, disclosed in this specification. End user computing devices are at times referred to as a "supervisor computing device" or "agent computing device" depending on the role or job function of the person using the computing device, but such terms are not intended to denote material distinctions in the hardware configurations or performance of the computing devices.

The embodiments discussed in this specification are described with reference to intelligent monitoring systems and methods utilized in a call center environment where provider personnel are engaging in shared experiences and performing customer service activities. However, those of ordinary skill in the art will appreciate that the disclosed systems and methods are not limited to use in a call center environment or use in performing customer service activities. Rather, the systems and methods are generally applicable in other contexts where system end users are engaged in real-time monitoring of the tasks and functions performed by other system end users.

Brief Technology Overview

The system captures a wide variety of data and information referred to as event data that defines a shared experience between an agent and a customer. The system utilizes the captured data and information to support and improve the customer shared experience by, among other things, implementing intelligent monitoring technologies and precision coaching.

To create the immersive experience, the system captures video, audio, and telemetry data from and end user's computing device. The use of novel Tune In technology to capture and stream audio data eliminates the need to interface with a telephone Automatic Call Distribution system by interfacing directly with an end user computing device data port (e.g., a Universal Serial Bus port) that is being used to receive and transmit audio data generated during ongoing telephone conversations. Video data and audio data is captured, streamed, and securely stored so it is available to implement intelligent monitoring of end user activities and precision coaching.

In another aspect of the invention, the system includes a OneTeam Agent technology framework implemented in part by a OneTeam Agent software application installed on end user computing devices. The OneTeam Agent software interfaces with an end user computing device web-camera to provide authentication functionality and compliance monitoring by, for instance, analyzing the end user's environment to determine the presence of unauthorized individuals, devices, or artifacts (e.g., a cellular phone or a notepad that could be used to record confidential information). The OneTeam Agent technology framework further implements other features that can include, authenticating and identifying end users and computing devices attempting to access a provider network and system performance and computing resource verification (e.g., ensuring network connectivity and the availability of necessary processing and memory).

Provider Systems

As shown in FIG. 1, an example provider system includes: (i) one or more agent computing devices; (ii) provider platform technology resources; (iii) one or more supervisor computing devices; (iv) a foundational analytics system; (v) an Automated Call Distribution System ("ACD system"); and (vi) an Adaptive Workspace System ("AWS"). The embodiment shown in FIG. 1 is not intended to be limiting, and one of ordinary skill in the art will recognize that the system may be implemented using a variety of suitable hardware or software configurations. For instance, the system could be implemented using separate computing devices to implement one or more of the provider resources shown in FIG. 1, such as separate servers for the Virtual/Computing Telephony Interface software platform ("VTI" or "CTI") and for the Virtual Desktop Interface ("VDI") software platform. Or alternatively, one or more of the provider resources can be implemented using the same computing device, such using the same server to implement the CTI and VDI The various system components are generally implemented by software applications running on one or more physical or virtual computing devices (e.g., a virtual desktop application). To illustrate, in one embodiment, the various event sources for the foundational analytics system are implemented by software applications that run on a physical agent computing device in communication with the Global Transaction Ingress Application Programming Interface ("GTI API") running on a separate server computing device. Alternatively, the event sources can be implemented as software applications running on a virtual computing device that is in turn running on the same physical computing device as the GTI API. The computing devices may also utilize software applications that function using resources available through a third-party provider, such as a Software as a Service ("SasS"), Platform as a Service ("PaaS"), or Infrastructure as a Service ("IaaS") provider running on a third-party cloud service computing device. For example, a cloud computing device may function as a resource provider by providing remote data storage capabilities and SaaS capabilities that implement the various software applications under the provider resources.

The physical computing devices for the provider system can be implemented as laptops, desktop computers, tablet computers, or network computing devices, such as servers. The computing devices may include a processor that communicates with a number of peripheral subsystems via a bus subsystem. These peripheral subsystems may include a storage subsystem, user-interface input devices, user-interface output devices, a communication system, and a network interface subsystem. By processing instructions stored as integrated software code or applications on one or more storage devices, the processors provide graphical user interfaces ("GUI"), permit communication with other electronic devices, and generally perform the steps of the present methods and implement the present systems.

Example GUI display screens are depicted in the attached figures. The GUI display screens may include features for displaying information and accepting inputs from users, such as text boxes, data fields, hyperlinks, pull down menus, check boxes, radio buttons, and the like. One of ordinary skill in the art will appreciate that the exemplary functions and user-interface display screens shown in the attached figures are not intended to be limiting, and an integrated software application may include other display screens and functions.

Capturing Event Data

The provider foundational analytics system captures a wide variety of event data and information that represents a shared experience interaction between a provider and a customer of a product or service. Event data can include, but is not limited to: (i) video data relating to a shared experience, such as a recording of an end user's computing device display screen or desktop captured and stored during a customer interaction that provides insight into what tasks and functions the agent was performing during the customer interaction; (ii) image data captured from a camera connected to an end user computing device ("camera data"); (iii) audio data of dialog between a customer and provider personnel, including a recording of a customer call; (iv) written transcript data of communications between provider personnel and a customer, including a transcript of audio data representing spoken discussions, email exchanges, or instant chat messages; (v) user data entered by an end user during a shared experience; and (vi) event data gathered from various event sources, such as an end user's telephone device or computing device.

Event data generally includes data generated by the end user's computing device as well as data generated by other event sources, such as cloud-based or remote software applications and hardware utilized by an agent computing device. Event sources can be hardware components (e.g., a desktop computer or telephone) or software applications (e.g., Internet browser or a background operating system process) that are utilized during a shared experience. The event data can include written transcript data such as emails and chat communications between agents and customers or among agents that is generated using an email or chat software application event source. Event data can also include audio data captured by a physical telephone or a virtual software-based phone or audio data captured by another software application, such as a remote virtual meeting software application. The audio data can also be converted to written transcript data for further processing.

Event data can include data generated by event sources that are separate from an end user's computing device or separate from an end user's desktop, such as communications from other provider personnel, communications or other data from Chat Bots or Knowledge Bots, or data generated when an agent participates in training in a different desktop environment than the environment utilized by an agent during a shared experience. The event data is captured synchronously (e.g., at periodic intervals) and asynchronously as events or actions occur (e.g., when an agent performs an action).

As shown in FIG. 1, an example provider foundational analytics system configuration according to one embodiment includes: (i) multiple categories of event sources; (ii) a GTI API running on a first server; (iii) a User Status API; (iv) a Memory Cache; (v) an Event Queue; (vi) an Event Database; (vii) a Presence API; (viii) an Event Hub; (ix) a Rules Engine; and (x) a Machine Learning Engine.

The event sources communicate with the GTI API directly. The GTI API correlates and associates related events into transactions that represent one or more activities or actions performed to accomplish a given task. In this manner, the foundational analytics system gathers data relating to individual actions performed by an end user or end user computing device and provides insight into how the end user devices are utilized to accomplish a given task or transaction over time as part of a shared experience between a provider agent and a customer. A description of the processes and devices used in capturing event data and organizing the data into transactions is also found in Applicant's U.S. Pat. No. 10,748,099 the entirety of which is incorporated herein by reference.

The system can accommodate multiple types of event sources in various configurations. As an example, the phone event source shown in FIG. 1 can be implemented as a separate hardware telephone device connected to a CTI system or as a virtual telephony interface VTI that runs as a software application on a physical or virtual end user computing device. Multiple software applications serving as event sources can run on a single end user computing device. The system will generally include a plurality of end user computing devices where each end user computing device implements multiple event sources.

The event sources capture event data that represents various activities occurring at the end user computing device as well as other useful information. The system can utilize any suitable number and type of event sources that are configured to capture event data and transmit the event data to the GTI API in an event data packet format. The event data can be transmitted using JavaScript Object Notation ("JSON") or any other suitable format. The event data packets are transmitted to the GTI API asynchronously as each event occurs to ensure real-time capture of relevant event data as opposed to sending the event data in event data packets at periodic or predetermined intervals.

The available data fields and content for the event data packets is customizable and will generally vary depending on, among other things, the event source application. Exemplary event data fields include, but are not limited to: (i) time and date data; (ii) an event identifier that can be used to determine the activity represented by the event data; (iii) an event type representing the category of activities represented by the event; (iv) one or more indicator flags indicating whether the event is a start event, end event, or neither; (v) an endpoint identifier such as an event source identifier that identifies the software application originating the corresponding event data; (vi) an endpoint identifier such as an event source user identifier User Principle Name ("UPN") used by the event source to identify the current end user of the event source application or the end user computing device, which can be, for instance, a username, employee number, or other identifier entered by the end user when logging into the end user computing device or into the software application that serves as the event source; (vii) a global user identifier ("GUID") that identifies the end user of the end user computing device and that is independent of the software applications or computing devices being utilized; (viii) a source record identifier that identifies a unique record in the event source application and that can be utilized by the Predictive Analytics or other application to lookup additional information in the source application's database about the event; (ix) a global transaction identifier ("GTID") discussed in more detail below; (x) a client account identifier and a line of business identifier that can be used by a service provider to identify a client or industry being served by the activities of end user and end user computing device; and (xi) any information available from the event source that is useful for real-time monitoring or analytics.

As shown in FIG. 1, the phone event data is captured and transmitted directly to the GTI API in real time. The phone event source can capture event data such as, a start call event, an end call event, or an on-hold event indicating that an ongoing telephone call has been placed on or taken off hold.

The system can also include various proprietary and non-proprietary software applications running on the end user computing devices. Non-proprietary or commercial software applications running on the end user computing devices can include, for instance, the computing device operating system software (e.g., Microsoft Windows®), Java® virtual machine, or Internet browser applications (e.g., Google Chrome® or Internet Explorer®). The proprietary and non-proprietary software applications capture event data such as text entered in a graphical user interface, the selection of an input function that initiates a keyword search in an Internet browser, or sending a communication through an instant "chat message" software application.

Proprietary software applications can be designed and preconfigured to asynchronously capture event data in real time for transmission directly to the GTI API. Non-proprietary applications, however, might not be configured to permit the asynchronous capture and transmission of event data. The system shown in FIG. 1 illustrates the use of a Digital Insights Desktop Agent ("DIDA") software application running on the agent or other end user computing device to interface with various non-proprietary applications (e.g., the Win32 API for Windows®) to enable the capture and transmission of event data.

The DIDA application may establish a protocol for reading the particular output of the non-proprietary software application and translating the output into a JSON packet for transmission to the GTI API. Alternatively, where a protocol for reading the output of a non-proprietary software application cannot be established, the DIDA may utilize techniques such as "screen scraping" that captures human-readable outputs from the non-proprietary application intended for display on a monitor. The DIDA application can be configured to read a variety of information occurring on the end user computing device desktop, including, but not limited to, capturing keystrokes, mouse movements, toggling between open "windows" or software application interfaces, opening software applications, or selecting various functions on the software applications (selecting buttons, pull down menus, entering text, etc.). The DIDA can capture not just the particular actions taken but also identify the software applications opened or used and the type of inputs or functions selected, such as recognizing that a function was selected to initiate a search, submit information to a database, play an audio file, among many other examples.

The event data is enriched by appending one or more user status elements to the event data. The GTI API queries the User Status API using the UPN, and the User Status API returns information relating to the end user that is then appended to the event data as user status elements. In some embodiments, the GTI API can perform the data enrichment function. Or alternatively, the data enrichment can be performed by the event source software application itself prior to transmission to the GTI API, as illustrated in FIG. 1 where the proprietary applications event source is preconfigured to generate site, account program, and line of business ("SAPL") data that is sent with the event source data to the GTI API. The generated SAPL data can also be utilized to properly direct transmission of the event data to a particular GTI API in embodiments where multiple GTI APIs are utilized. So, for example, all event data coming from particular provider sites can be directed to a dedicated GTI API for those sites.

In the context of a call center where the end users are provider agents fielding consumer calls regarding various products or services provided by various clients, the user status element data can include: (i) a client account name and identification number for the client; (ii) a line of business identifier for the call service provider (i.e., a given industry or category of products); (iii) an end user computing device identifier; (iv) an end user role designation (i.e., junior agent, senior agent, supervisor, etc.); (v) geographic location data for the provider end user; (vi) a site identifier if the provider end user is working from a given provider location or office; (vii) an "on-network" flag indicating whether the provider end user is working remotely or from within a provider location; or (viii) any other information useful to the provider. In this manner, the event data is enriched so as to provide insight beyond just what activities occurred at the end user computing device. So, for instance, a provider could then determine whether end user at a particular location or working for a particular client answer more calls (i.e., more start call events) or spend more time per call (i.e., time between start call event and end call event) than end users at other locations or working for other clients.

Transaction Analysis and Initial Processing of Event Data

Figure 2:
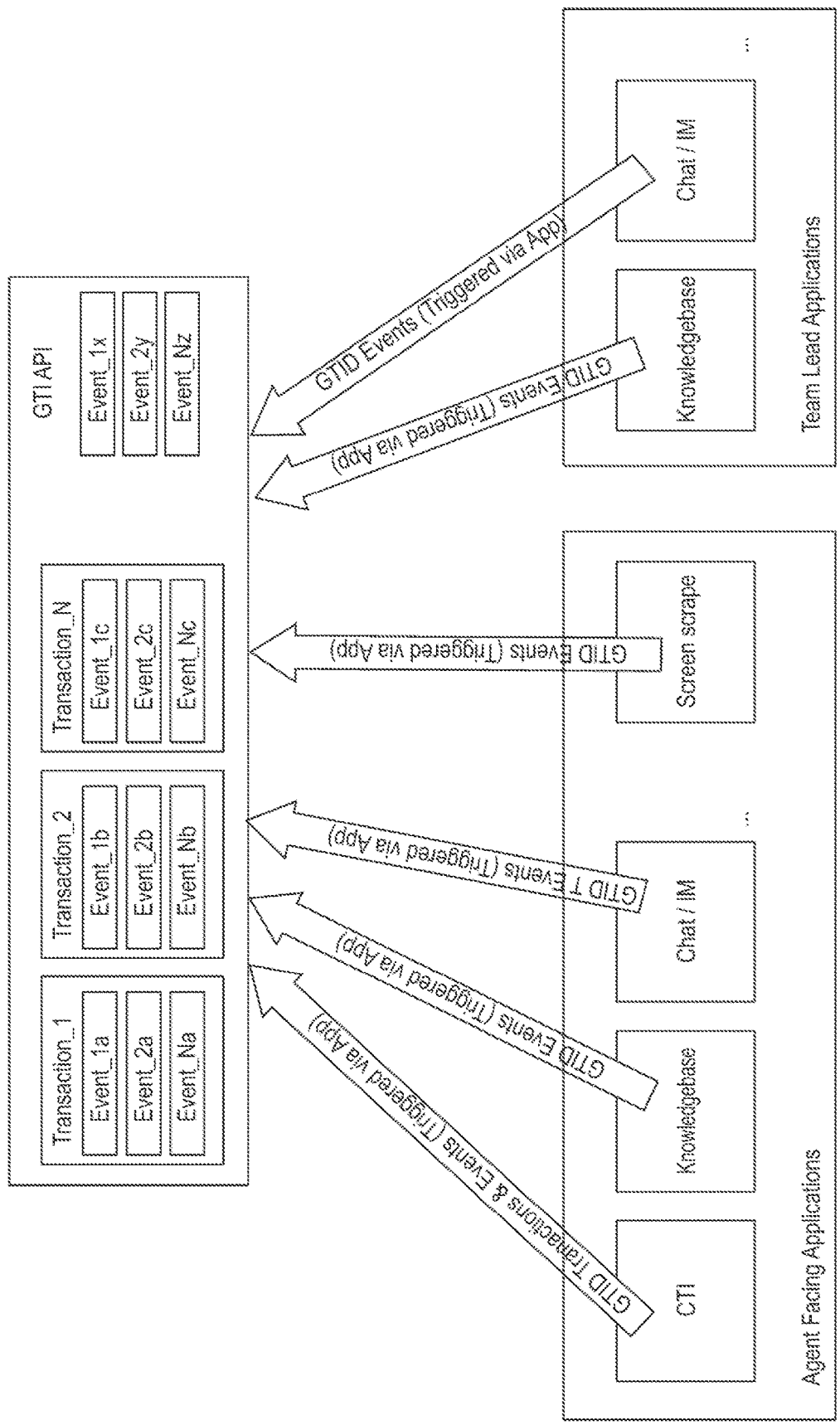
FIG. 2 depicts discrete transactions comprising event data from multiple sources.

Following receipt of event data and enrichment by the User Status API, the GTI API performs a transaction analysis that correlates the event data into transactions that represent a series of related activities performed by the end user computing device to accomplish a particular task. The correlation of event data into transactions is depicted in FIG. 2 where various event source software applications (e.g., CTI, Knowledgebase, Chat/Instant Message) transmit event data, or "GTID Transaction & Events," to the GTI API. The GTI API then correlates the events into separately identified transactions (i.e., Transaction_1, Transaction_2, ... Transaction_N).

The event data can be correlated into transactions by, for example, associating a global transaction identifier ("GTID") with the event data by appending the GTID to the event data or associating the event data with a particular GTID that is already stored to a relational database, such as the Memory Cache shown in FIG. 1. To facilitate the correlation, certain events can be designated by the event sources as start events or end events signaling the beginning or end of a transaction. In a call center, for example, many transactions will focus on the receipt and handling of customer phone calls. Thus, answering the phone can be designated as a start event and hanging up the phone can be designated as an end event. On receiving event data from an event source, the GTI API determines both the UPN and whether the event data represents a start event or end event. The event can also be designated as an intermediate event within the transaction, or the lack of a start event or end event designation can be interpreted as the event data representing an intermediate event.

The GTI API utilizes the UPN to query the Memory Cache, which can be implemented as a database that includes a table of open GTIDs and the associated UPN. This permits the GTI API to determine whether there is an open transaction for received event data and identify the associated user or end user computing device. If the event data received by the GTI API already includes a GTID, then an open transaction exists. The GTI API "inserts" the event data into the open transaction by associating the open GTID with the received event data and storing the event data to the Memory Cache. If the received event data represents an end event, the GTI API deletes the GTID from the Memory Cache, and the event data is stored to the Event Que as a transaction. Otherwise if the Memory Cache query returns an open GTID and the event data does not represent a start or end event, the transaction remains open and the GTID remains stored to the Memory Cache while the event data is associated with the open GTID.

Determining transactions based on event data can be illustrated with the following simplified example for an exemplary transaction occurring at a call center that begins with a call answer event using a CTI phone event source. The call answer event is designated as a start event and transmitted to the GTI API where it is associated with an existing open transaction (if one exists) corresponding to the end user's identifier/UPN. The call answer event can be followed first by a send chat event and then by a receive chat event using an instant messaging chat application. The send and receive chat events are transmitted to the GTI API, and the user identifiers (UPN) for both the message sender and the message recipients can be used to query the Memory Cache for the existing open GTID and associated with the corresponding GTID. Lastly, the call center end user ends the call, which prompts the CTI event source to generate an end call event that is transmitted to the GTI API and associated with the corresponding GTID.

The start call, send chat, receive chat, and end call events are all associated with the same GTID and the same end user UPN such that the events can be analyzed together as part of a single transaction. This permits the system to determine a call duration (e.g., time between start and end events), the number of chat messages, as well as other information relating to the call, thereby providing useful information at the transactional rather than single event level. This also permits an analysis of a given end user's actions across multiple transactions, thereby providing useful insight into end user status and performance.

Turning again to FIG. 1, after event data is processed by the GTI API, the event data is stored to the Event Queue as an individual event associated with a GTID. The event data is optionally subjected to additional processing while stored to the Event Queue, such as filtering, masking, or tagging. Event data masking scrubs the event data to remove certain information according to predetermined and customizable preferences, such as removing social security numbers, financial account numbers, or other sensitive data. The event data can also be filtered to delete particular events according to predetermined and customizable preferences.

The data labeling analysis creates an ontology describing a shared experience between a provider and a customer. The labeling analysis associates the event data organized by transactions with label data representing various label categories, including, but not limited to, a customer interaction type identifier (e.g., sales call, technical support, etc.), a customer intent identifier (e.g., the customer's objective in contacting the provider), or a customer interaction segment identifier (e.g., call opening, issue description, issue resolution, closing, etc.).

The labeling analysis relies on a combination of human-labeling and automated labeling. Provider personnel may first listen to an audio recording or review a transcript of a customer interaction and determine approximate time frames for the opening, issue description, issues resolution, and closing segments. The human-applied label data is stored to a relational database with the event data where, for example, the label data is correlated to a particular event and time stamp. As more event data is gathered and labeled by provider personnel, the human-applied label data can be used to model and train the algorithms for performing the labeling analysis so that future shared experiences can be labeled algorithmically.

In one example, the various categories of event data can be used as inputs to train a neural network where the individual nodes represent probability functions and the connections between nodes represent weights assigned to each node input/output. The neural network model may recognize that if the event data shows an end user computing device accessing a product catalog one-minute into a shared experience, this event data has a high probability of correlating to label data showing the shared experience is a sales call.

In other cases, sentiment analysis or natural language processing techniques are used to analyze audio data from a shared experience to apply labeling data. A Bag-of-Words model may recognize that the presence or frequency of the words "hello" or "hi" might be indicative of event data correlating to label data representing the opening segment of a shared experience. A more complete description of the labeling analysis techniques utilized to characterize a shared experience can be found in Applicant's co-pending application Ser. No. 16/908,280, the entirety of which is incorporated herein by reference.

In addition to filtering, masking, and tagging, the event data stored to the Event Queue is multiplexed to group the event data according to the event source software application before being stored to the Event Database for longer term storage. For instance, the event data multiplexing may identify all event data generated by a given Internet browser, instant messaging application, or by a phone event source. The system stores the multiplexed event data to an Event Hub, or queue, before passing the multiplexed event data to a Rules Engine or Machine Learning process for further analysis to provide customizable insights into the current or past activities of the end user computing device(s).

The event data is also sent to a Presence API to perform a state analysis that results in end user computing device state data. The state data indicates a status of the end user computing device or event source. In the example embodiments described herein, the Presence API conducts a state analysis utilizing the event data to ascertain state data such as: (i) whether the end user computing device is or was logged into the provider system ("On System" or "Off System"); (ii) whether the end user of the end user computing device is or was engaged in a call ("On Call" or "Off Call"); (iii) whether the end user of the end user computing device is or was engaged in an instant messaging chat session with a consumer ("On Chat" or "Off Chat"); or (iv) a variety of other useful states ascertained from various event sources.

Video Data, Camera Data, and Audio Data Recording

The event data further includes video data, camera data, and audio data of shared experiences. Example provider technology resources utilized to capture, stream, record, edit, and store video data, camera data, and audio data are shown in the example system configuration of FIG. 1. Video data and audio data are continuously captured by a Digital Video Recorder Client ("DVR Client") software application running on end user computing devices. The video data and audio data are then transmitted to a Digital Video Recorder Application Programming Interface ("DVR API") software application and stored to a temporary storage buffer managed by the DVR API software application. The DVR API is configurable to continuously store a predetermined duration of video data and audio data in the temporary storage buffer, such as the prior five minutes or ten minutes of a shared experience, before the video data and audio data is either deleted or moved to long term storage. The video data and audio data is optionally moved to a more permanent long term storage location such as a Digital Video Recording database ("DVR DB") either upon a request generated by an end user computing device or according to predetermined campaign parameters, as discussed in more detail below.

The video data includes end user screen data, which is a series of screen captures from an end user computing device display screen that are taken at regular intervals (e.g., once per second). The screen captures are combined and can be played as a continuous video of what functions were performed by the end user computing device over a given time period. The audio data can include recordings of telephone conferences between or among end users and customers that is captured using the Tune In technology shown in FIGS. 3 and 4.

Once video data and audio data are recorded by the DVR API, a tag clip identifier and/or machine labels are appended to the video data and audio data or associated with the video data and audio data in a relational database. A tag clip identifier can be a unique alpha numeric identifier for the shared experience. Machine labels include event data and other data relevant to a shared experience associated with the video data and audio data, such as a customer name, a customer status (e.g., "VIP" customer or new customer), a provider line of business identifier, a provider client name (i.e., the enterprise that sells products or services for which the provider is rendering support), a customer or agent telephone number, an agent GUID, time and date data, among many other types of data.

The DVR API software application stores the video data and audio data associated with a tag clip and machine labels to the DVR BD for long term storage and further analysis. After the video data and audio data is stored to a permanent database, a DVR Slicer software application applies time codes to the video data to facilitate review of the video data in a video playback software application according to time frames (i.e., minutes and seconds). A Video Redaction software application permits redaction of sensitive information from the video data, such as customer credit card numbers or identifying information. The video data is then encrypted before being made available for review by provider personnel.

The camera data is video and image data captured from a camera connected to, or integrated with, an end user computing device, such as a "webcam" often used for video conferences. The camera data is captured by the Digital Insights WebCam Agent ("DIWA") software application running on the end user computing device. The camera data is captured upon request by an end user computing device or according to predetermined campaign parameters, and the camera data is stored to an Image & Camera Data Database, as explained more fully below.

Tune-In Technology

The audio data and video data are continuously captured and stored by the DVR Client software application running on the end user computing devices and by the DVR API software application running on the provider's system. But the DVR API does not enable real-time access to the video data and audio data such that a "live" view of an end user computing device is available through the DVR API. Instead, the system embodiment shown in the attached figures utilize a Digital Insights Audio Video Application Hub ("DIAVA Hub") and an Agent Desktop DIAVA Client software application running on the end user computing device to provide real-time streaming of video data and audio data generated by an end user computing device engaged in a shared experience. In particular, the novel Tune-In technology disclosed herein enables streaming of real-time audio data to multiple end user computing devices, which is a feature that is not available when using conventional ACD systems.

Figure 3:
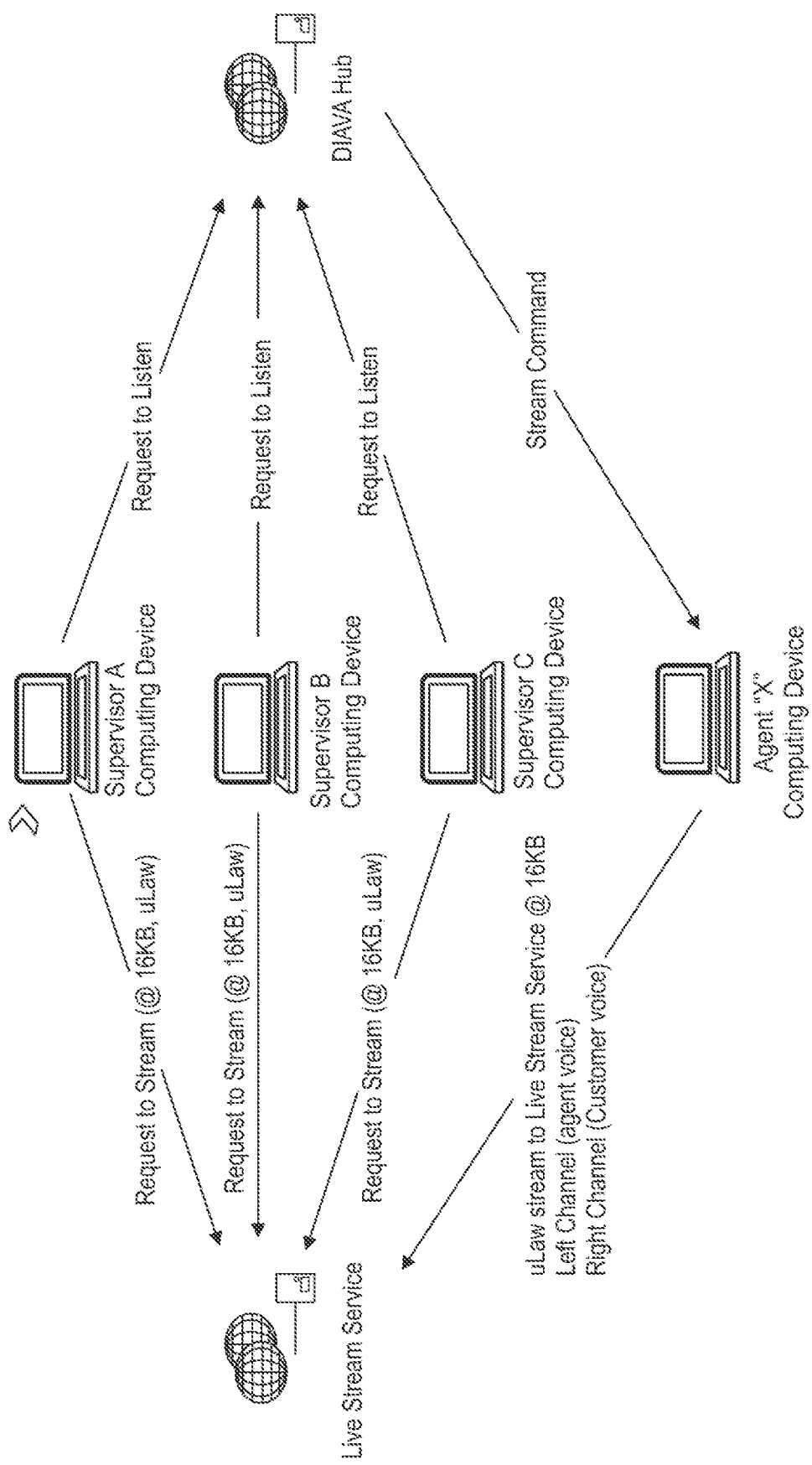
FIG. 3 illustrates messages exchanged to initiate audio data streaming as part of the Tune-In Technology.
Figure 4:
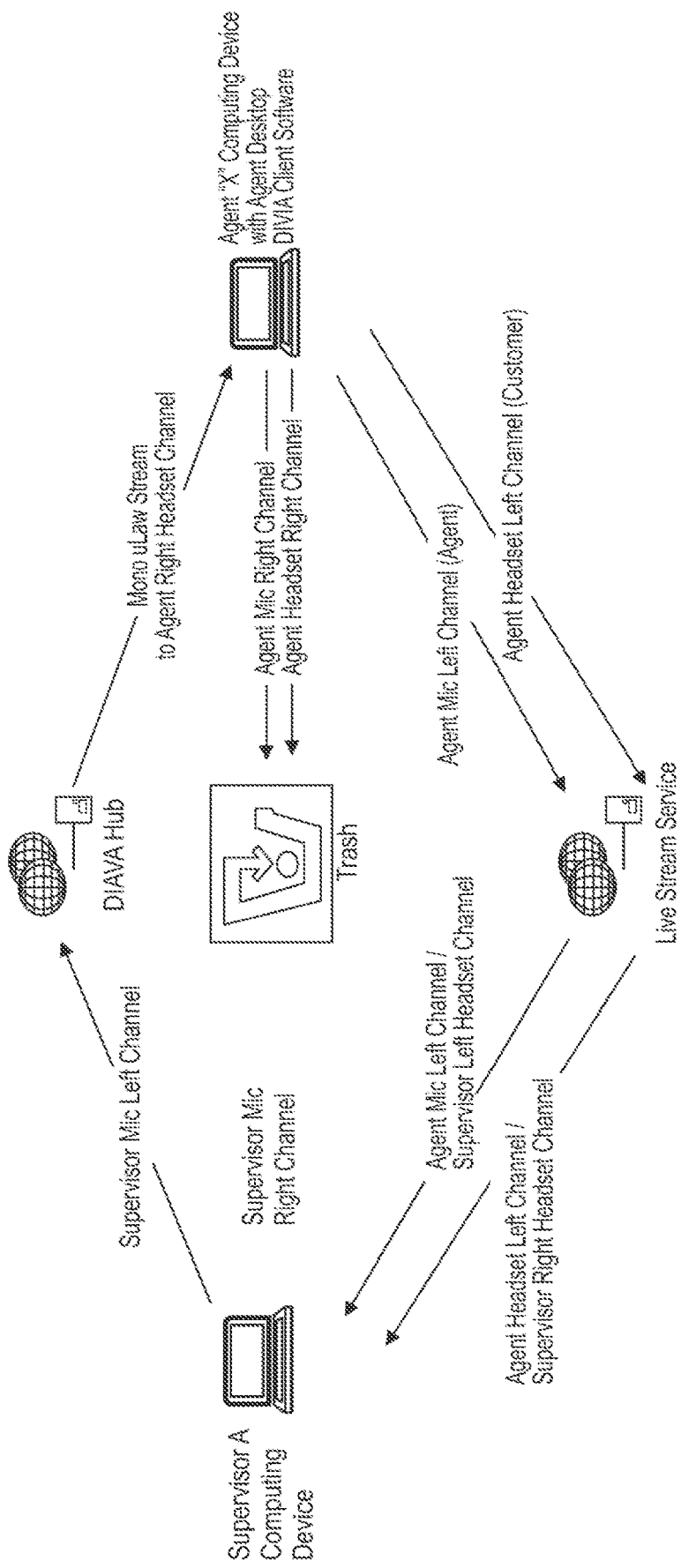
FIG. 4 illustrates audio data channels used as part of the Tune-In Technology.

The Tune-In technology is illustrated in FIGS. 3 and 4 and enables real-time access to audio data generated during a telephone call without the need to interface with a third party ACD system. Conventional techniques for interfacing a provider's network with a third-party telephone network (i.e., an ACD system) have several disadvantages that are overcome by the present Tune-In technology. Capturing, listening to, and inputting audio data (i.e., interjecting during an ongoing call) requires developing customized Application Programming Interfaces ("APIs") to provide an interface between a provider's system and the ACD system. Developing and maintaining customized APIs can be time consuming and costly.

Even after an API is developed, the ACD system itself presents functional limitations. For instance, a traditional ACD system does not allow audio data from a call to be distributed, or streamed to multiple end user computing devices. This means that other than the participants to a call, only one other end user computing device can listen to a call at any given time. End user computing devices that are monitoring a call also cannot quickly switch to another call because the API must establish a new communication session with the third-party ACD system.

Additionally, for an end user computing device to input audio data into the call (i.e., speak to an agent during a call or interject into the call), the end user computing device must interrupt the incoming audio data stream so that the call is no longer audible to the end user who is speaking. Thus, conventional systems function similar to a walkie-talkie in that a third-party end user cannot listen to audio data and speak at the same time.

The present Tune-In technology overcomes the disadvantages of conventional systems by interfacing with a data port of an end user computing device, thereby eliminating the need to develop a customized interface between a provider's system and an ACD system. The Tune-In technology will be described with reference to an example functionality where a supervisor computing device is monitoring an ongoing call between an agent and a customer. Agents engaged in an ongoing call may be using a CTI telephone system or a conventional telephone that routes audio data through a microphone and headset (or speaker) connected to a data port of the end user computing device, such as a universal serial bus ("USB") data port.

With reference to FIG. 3, an end user computing device operated by a supervisor initiates the process of monitoring an ongoing call by selecting a Listen function on a user interface screen. Selection of a Listen function transmits both a Request to Listen message to the DIAVA Hub and a Request Stream message to a LIVE Stream Service. The DIAVA Hub and the LIVE Stream Service can be implemented as software processes running on a network computing device, such as a server. The Tune-In technology can accommodate requests from multiple end user computing devices to monitor the same call, such as requests from supervisor computing devices "A," "B," and "C" (shown in FIG. 3) for each monitor the same ongoing call involving the end user computing device used by "Agent X." The example Tune-In technology shown in the attached figures is not intended to be limiting, and the system could also accommodate separate requests from each supervisor end user computing device to monitor separate ongoing calls.

Both the Request to Listen Message and the Request Stream message include an identifier, such as a GUID, for both the requesting supervisor computing device and the target agent end user computing device to ensure proper routing of the messages and requested audio data. The Request Stream message further includes a token, such as a token received upon login from an Active Directory Service that identifies a requesting user's permissions on a provider network. The Live Stream Service can utilize the token to verify that the requesting supervisor end user computing device has the appropriate permissions to receive the requested audio data. In this manner, a supervisor end user computing device can be limited to monitoring agents that report to the supervisor or agents that work for a particular client or line of business to maintain confidentiality and system security. The token can also be used by the Live Stream service to limit the functions available to a supervisor end user computing device, such as allowing the supervisor end user computing device to listen to an ongoing call but not to input audio data by speaking to the agent during the call or not allowing the supervisor end user computing device to receive a transcription of the audio data. In the event an end user computing device attempts to access a Tune-In function that is outside of the allowable permissions, the system can generate an audible message that is transmitted to and played by the end user computing device informing the end user that the requested function is not permitted.

Turning again to FIG. 3, in response to the Request to Listen message, the DIAVA Hub transmits an audio stream command message to the target agent end user computing device. The audio stream command message is processed by an Agent Desktop DIAVA Client software application running on the end user computing device, which causes the end user computing device to begin transmitting audio data to the Live Stream Service. The Live Stream Service in turn transmits the audio data to one or more requesting end user computing devices operated by a supervisor. When a supervisor speaks to an agent, the supervisor end user computing device can in turn transmit audio data to the agent end user computing device. Audio data generated by the supervisor end user computing device is first transmitted to the DIAVA Hub before being routed to the agent end user computing device using a GUID sent with the audio data.

As illustrated in FIGS. 3 & 4, audio data is transmitted to and from end user computing devices in separate right and left audio data channels. When a customer speaks, the audio data is transmitted through an agent's speaker device, such as a telephone headset, in separate right and left audio data channels. Similarly, when an agent speaks, the sound is received by an agent's microphone and separated into right and left audio data channels. And when a supervisor speaks to an agent, the sound is likewise split into right and left audio data channels after being received by a supervisor's microphone.

The Tune-In technology selects only one of the right or left audio data channels for use in monitoring an ongoing telephone call. Selecting only one audio data channel not only conserves network bandwidth but also avoids echo effects that would otherwise result from the use of both the right and left audio data channels. Selection of only one audio data channel to avoid echo effects can be better understood with reference to FIG. 4.

When supervisor "A" speaks, only the left audio data channel is transmitted to the DIAVA Hub and routed to the right speaker or headset audio data channel of the agent end user computing device. When the agent speaks, only the left audio data channels from the agent computing device headset and microphone are transmitted to the Live Stream Service. In this manner, audio data generated by the supervisor computing device that is input to the agent's right headset audio data channel, is not output through the agent's left audio data channel when the agent speaks. Otherwise, the audio data generated by the supervisor computing device would be fed back to the supervisor computing device, thereby creating an undesirable echo effect. Separating the left and right audio data channels also enables the feature whereby the supervisor computing device can input audio data that is not heard by a customer during an ongoing call. By selecting a Whisper function on a graphical user interface of the supervisor computing device, the audio data generated by the supervisor computing device is input to the agent's right headset or speaker audio data channel but is not output to the agent's microphone left audio data channel. Audio data from the agent's microphone left audio data channel can be routed to the customer without the audio data generated by the supervisor computing device. Thus, the customer cannot hear the supervisor, which avoids unnecessary disruption to the shared experience. If desired, however, the supervisor computing device could select a Barge function on a supervisor computing device to output audio data that is audible to a customer during a shared experience.

In one example embodiment, the audio data is transmitted by the end user computing device and the Live Stream Service at a rate of 16 kilobytes per second (KB) using the μ-law or "ulaw" compression format. Separating the left and right audio channels and utilizing only one of the left or right channels for transmitting each audio data source facilitates transcription of the audio data and allows use of the ulaw compression format, which otherwise could not accommodate processing four channels at a time. The ulaw compression format has the advantages of permitting efficient use of bandwidth while preserving the capability to transcribe the audio data into text. The bit rate and compression format can be varied depending on the bandwidth and audio quality requirements of a given provider network.

The real-time streaming capability provided by the Tune-In technology enables supervisor end user computing devices to efficiently monitor multiple agent end user computing devices at the same time. Access to the audio data from shared experiences and efficient monitoring of multiple end user computing devices is further enabled by the PreView functionality discussed below that is available through the AWS Intelligent Monitor interface shown in FIG. 5. With conventional systems where the ACD limits the ability to stream audio data to multiple end user computing devices, the audio data could not reliably be made available to supervisor end user computing devices in part because of the possibility that multiple end user computing devices might request the same audio data feed. Now, however, the Tune-In technology makes such audio data readily available to multiple end user computing devices thereby expanding access to a shared experience by provider personnel and computing devices.

PreView Functionality

Figure 5:
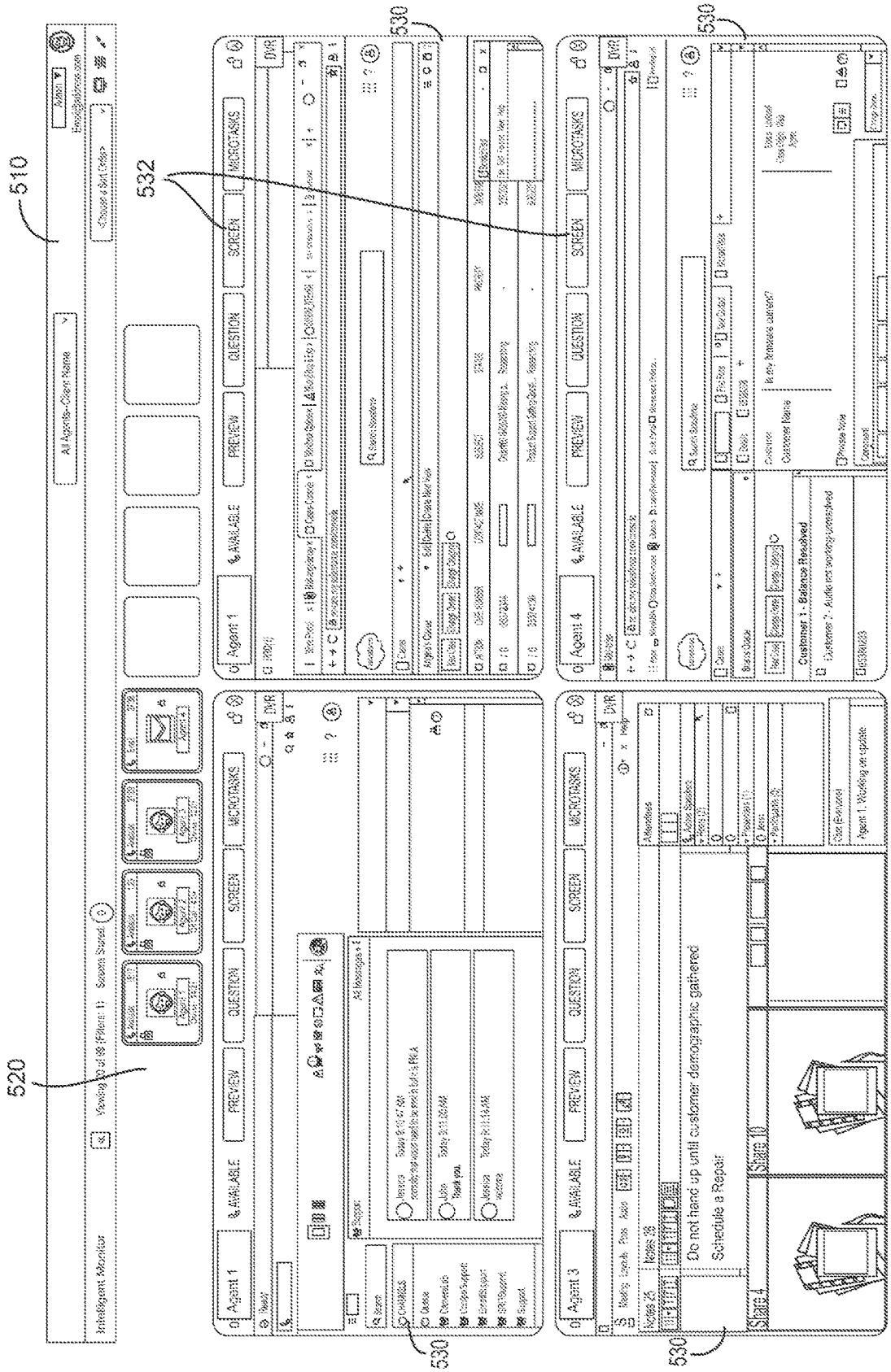
FIG. 5 is an example AWS Intelligent Monitor graphical user interface.

The Adaptive Workspace System shown in FIG. 1 includes Adaptive Workspace software code that generates integrated AWS interfaces to coherently and seamlessly display substantial volumes of data. The AWS interfaces are used to implement the real-time monitoring of, and collaboration between, end user computing devices. An example AWS Intelligent Monitor graphical user interface is shown in FIG. 5. The AWS Intelligent Monitor interface provides a home screen or dashboard for real-time monitoring and collaboration and is generated using the enriched event data, presence data, and state data, among other data sources.

The example AWS Intelligent Monitor interface shown in FIG. 5 illustrates the use and display of data in the context of a call center environment. The Intelligent Monitor interface is configured for use by a supervisor computing device in monitoring and managing various agent computing devices, and the Intelligent Monitor interface includes: (i) a header section 510; (ii) an agent tile recommendation section 520; and (iii) agent blackboards 530.

End user computing devices are depicted using square icons, referred to as "tiles," shown on the agent tile recommendation section 520. The agent tiles can present state data such as the agent being "on call," "off call," or "email" (i.e., the agent computing device is actively using an email software application). The agent state data can be presented through text, by changing the icons displayed within the tiles, by changing the colors of the tiles, or through other graphical means.

Machine learning models and rule-based software engines determine and display agent state data, such as transitioning an agent tile from green to red if an agent computing device has been engaged in an ongoing shared experience longer than a predetermined threshold (i.e., the agent has been on a call too long and may need assistance or the agent computing device is malfunctioning). The system also implements a Campaign Management system, as discussed below, and includes campaign management software that generates and transmits alerts to a supervisor end user computing device if an agent end user computing device needs assistance or if a compliance violation is detected (e.g., the agent computing device improperly accessed or transmitted sensitive customer information).

A supervisor end user computing device can select certain agent computing devices for closer monitoring, or agent end user computing devices can automatically be selected for closer monitoring upon detection of an alert condition (i.e., the agent needs assistance or a compliance violation was detected). The agent computing devices selected for monitoring can be represented by tiles that are "locked" to the agent tile recommendation section 520 or agent blackboards 530 shown in FIG. 5.

The agent blackboards 530 are configured to display a wide variety of event data and other information relevant to a shared experience. For instance, using the foundational analytics system discussed above, the agent blackboard 530 can display data and information that includes, but is not limited to, an agent's name, a customer name who is engaged in a shared experience with an agent, a customer status (i.e., a new customer or VIP customer), the number of shared experiences an agent computing device has handled during a current shift, or an average handle time for each shared experience.

Importantly, the agent blackboard 530 further provides access to the PreView feature through selection of the Screen 532 function shown in FIG. 5. Selection of the Screen 532 function initiates streaming of video data, also called end user screen data, that shows the agent end user computing device desktop display screen. The supervisor end user computing device can select an agent end user computing device desktop screen shown on the agent blackboards 530 to begin streaming audio data from an ongoing shared experience using the Tune-In technology. Thus, a supervisor end user computing device can both see the agent computing device desktop and listen to real-time audio data of an ongoing telephone conversation. In one embodiment, the AWS Intelligent Monitor interface is configured to display video data from up to six agent end user computing device screens at one time.

Selecting the Screen 532 function on the agent blackboard 530 transmits a screen data request message from a requesting end user computing device (often a supervisor computing device) to the DIAVA Hub. The screen data request message includes a UPN or other identifier for both the requesting end user computing device and the target end user computing devices (often an agent computing device) for which the display screen is to be streamed. The UPN or other identifier is used to ensure proper routing of the messages and the video data and audio data.

In response to receiving the screen data request message, the DIAVA Hub transmits a screen share command to the Agent Desktop DIAVA Client software application running the target end user computing device. The Agent Desktop DIAVA Client software application generates the video data by, for example, initiating a periodic screen capture at once per second. The Agent Desktop DIAVA Client software application continuously transmits the end user screen data to the DIAVA Hub as the video data is captured (i.e., the end user screen data is streamed).

The DIAVA Hub streams the video data to the requesting end user computing device where the video data can be displayed as a video representing the functions and tasks performed by the target end user computing device. The DIAVA Hub can stream video data to multiple requesting end user computing devices so that multiple supervisors can simultaneously view the target end user computing device desktop display screen in real time. Centralizing the streaming function using the DIAVA Hub increases network efficiency by dedicating resources to the streaming of video data and by reducing the number of feed streams required in instances where multiple end user devices are receiving a stream of video data.

Figure 6:
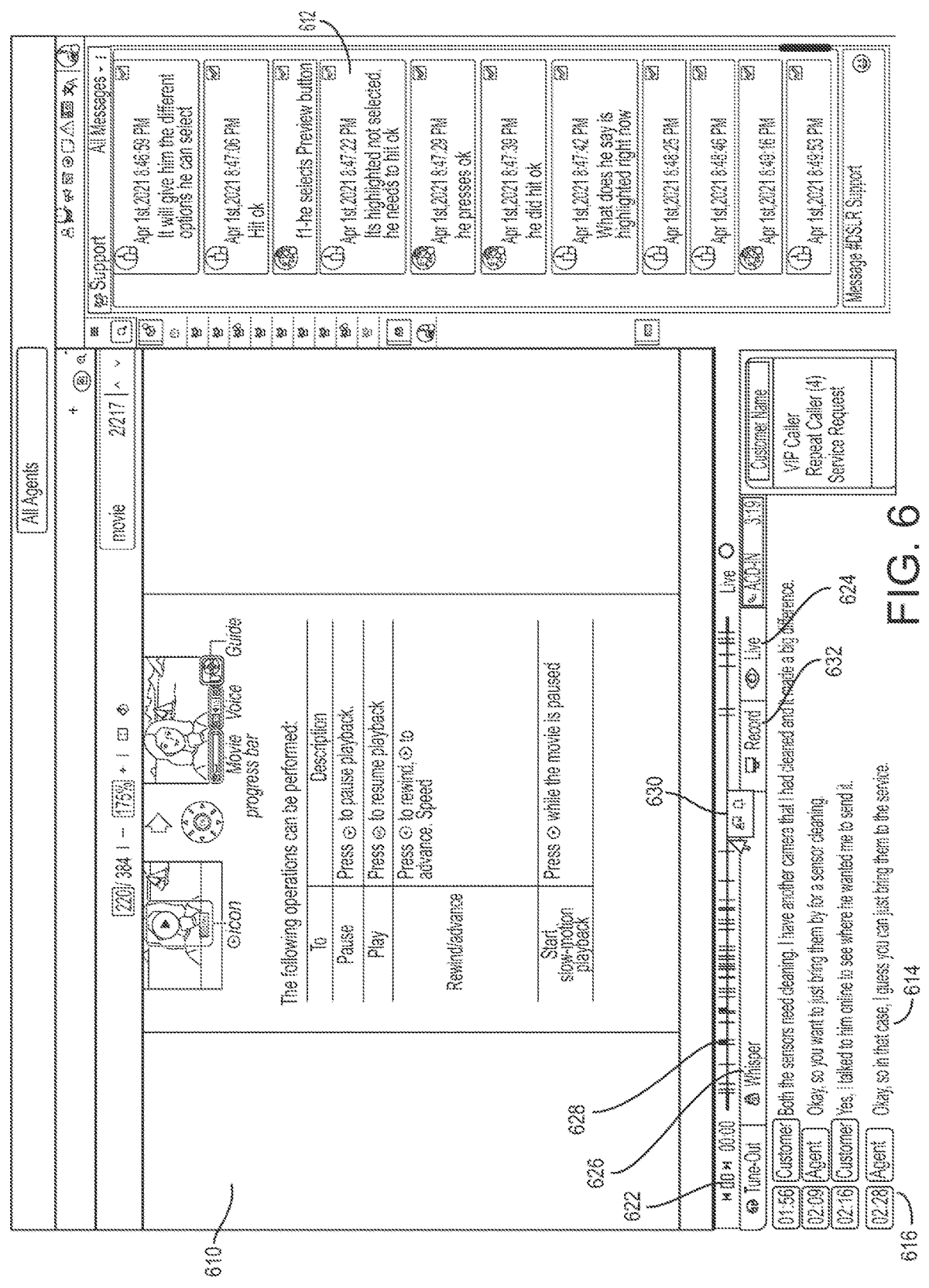

A supervisor end user computing device can utilize the Shared Experience Review graphical user interface shown in FIG. 6 to provide enhanced review features that allow deeper insight into a shared experience. The Shared Experience Review interface presents the video data and the audio data streamed by an agent end user computing device. The Shared Experience Review interface includes a panel with control functions 622 for playing, pausing, rewinding, or fast forwarding playback of audio data and video data that is shown as a video of an agent computing device desktop screen 610. The agent computing device desktop screen 610 shows in real-time what the agent computing device is viewing and what tasks and functions are being performed.

After the control functions 622 are used to pause or rewind the audio data and video data, the Live function 624 can be selected to return to a real-time view of agent computing device desktop screen 610 and real-time audio data That is, a supervisor end user computing device can toggle between reviewing video data and audio data stored by the DVR API software application to a temporary storage buffer or reviewing the video data and audio data streamed by the DIAVA Hub and Live Stream Service.

The Shared Experience Review interface displays a transcript 614 of the audio data from a shared experience along with event data 616 showing, for instance, when certain audio data was generated and by whom (i.e., who was speaking and when). If a supervisor end user computing device reviewing the shared experience video data and audio data desires to mark a particular time in the playback, the supervisor end user selects the event marking function 630 to generate a shared experience digital marker 628. The shared experience digital marker 628 is shown as a square on the playback control 622 timeline of the Shared Experience Review interface. Once marked, the shared experience digital marker 628 can be graphically selected by clicking on the square to play the audio data and video data from the shared experience.

The digital marking feature is useful, for instance, if a supervisor end user observes a coachable moment, such as an instance where a compliance violation occurred, the agent did something particularly well that should be repeated, or the shared experience could be improved (e.g., by attempting a different problem resolution, consulting a different resource, etc.). Selecting the digital marker 628 can also generate a Coaching Event database record that includes a portion of the video data and audio data associated with the coachable moment. The Coaching Event database record can also include event data and other information relevant to the coachable moment, such as a GUID or UPN for the agent or agent end user computing device, a client identifier, a label indicating the segment of a shared experience where the coachable moment occurred, time and date information, and a narrative description of what tasks could be improved or repeated. The Coaching Event database record can be transmitted or made available to the agent end user computing device and used as part of a training opportunity where a supervisor reviews the coachable moment with the agent.

Selecting the Record function 632 on the Shared Experience Review interface sends a record request message to the DVR API software application that instructs the DVR API to initiate storage of the video data and audio data to the DVR DB for longer term storage outside of the temporary storage buffer. The DVR DB can be implemented by a Secure Files Storage cloud storage system. Upon selection of the Record function 632, the end user computing device presents the end user with options to record a specific time period within the temporary storage buffer, such as recording for the prior five minutes of a shared experience and for the next ten minutes going forward. Selection of the Record function 632 and receipt of a record request message by the DVR API causes the DVR API to transmit a capture recording message to the DIAVA Hub. The record request message and the capture recording message can include a GUID or other identifier for the target end user computing device as well as recording instructions data that specifies the duration of time to be recorded.

The DIAVA Hub provides an interface with the Agent Desktop DIAVA Client software application running on the target end user computing device. The DIAVA Hub transmits a recording command to the Agent Desktop DIAVA Client software application that ensures the video data and audio data is transmitted to the DVR API for storage to the DVR DB. The DVR API Service software application appends a tag clip identifier and/or machine label data to the video data and audio data. The DVR Slicer software application applies time codes to the video data and audio data to facilitate review of the shared experience using a video playback software application. The video data is then redacted and encrypted before being stored to the DVR DB.

Digital Insights WebCam Agent (DIWA)

In addition to monitoring an end user's digital environment, the provider's system can additionally monitor risks presented by an end user's physical work environment, such as the presence of unauthorized third persons or objects. The end user's physical environment is monitored by capturing images or video (i.e., camera data) showing the end user and the end user's work environment using a camera connected to, or integrated with, the end user computing device. The example embodiments described herein refer to the use of camera data to allow supervisor end users to monitor agent end users; though, the system could be employed to permit monitoring of end users regardless of their job function or status with a provider.

Figure 7:
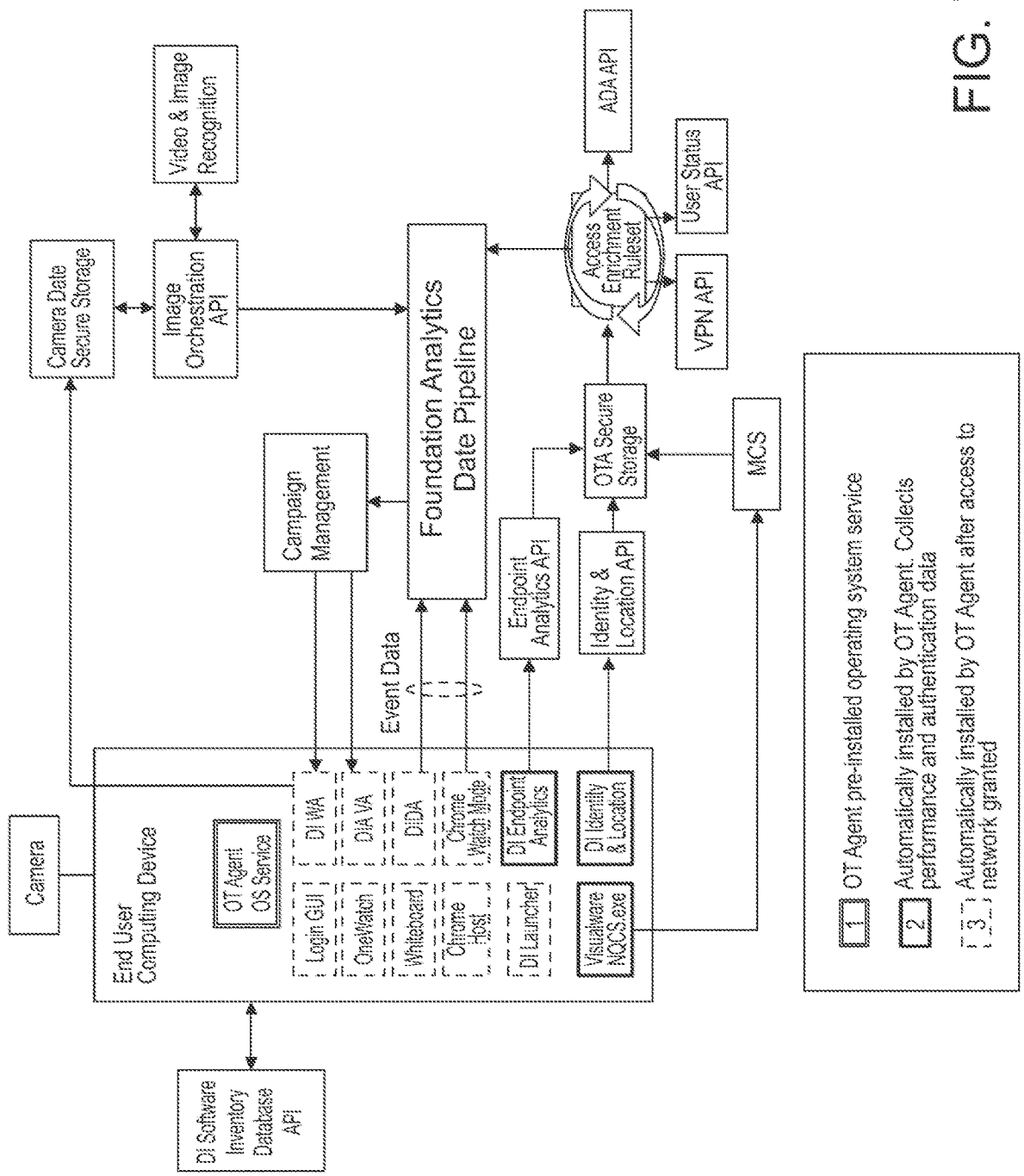
FIG. 7 is an example system diagram according to one embodiment that shows components used to generate and capture camera data and components of the OneTeam Agent technology framework.

The camera data can be captured continuously and stored to a temporary storage buffer, upon request by an end user computing device, at predetermined intervals (i.e., once per hour during an end user shift), or according to predefined campaign parameters using a Campaign Management System, as shown in FIG. 7. The captured camera data can be a single image, a video, or a series of images taken at regular intervals that can be stored together and played as a video.

Figure 8:
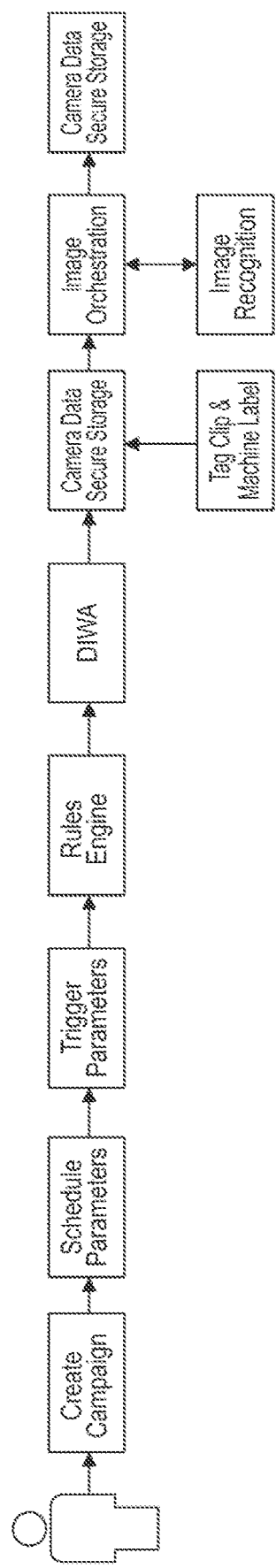
FIG. 8 illustrates the steps for implementing a campaign management system to generate and capture camera data.

An example process for implementing a camera data campaign is depicted in FIG. 8. The process begins at the Schedule Parameters step where provider personnel establish Schedule Parameters, which are criteria for determining when camera data should be generated and captured. The campaign can accommodate a wide variety of possible Scheduling Parameters. Example Schedule Parameters include, without limitation, capturing camera data: (1) at the start of a shared experience; (2) during sensitive segments or portions of a shared experience, such as when a customer is known to be providing medical or financial information; (3)

when an end user is accessing a user interface page known to include sensitive information, such as reviewing a customer profile webpage that may contain a social security number or credit card information; or (4) when a compliance event is detected, such as an end user computing device attempting to access customer information that the end user does not have permission to access or that does not match the identity of the current customer engaged in a shared experience with the end user.

The campaign process continues with the Trigger Parameters step to establish system events that result in the capture and storage of camera data. The trigger parameters can include, for example, initiating storage of camera data upon receipt of event data showing that the end user computing device has utilized an Internet browser software application to access a designated display screen known to include sensitive information. The Trigger Parameters can also specify the number of images to be taken or a duration of video or images to be stored, such as storing a series of images or video taken over a thirty second period.

At the Rules Engine step, the Scheduling Parameters and Trigger Parameters are stored to a cloud-based rules engine that monitors the event data received from the Foundational Analytics Data Pipeline to detect the Trigger Parameters. When a Trigger Parameter is detected, the rules engine transmits image capture instructions to the DIWA software application running on the end user computing device. The DIWA software application interfaces with the end user computing device camera and initiates the generation of camera data according to the image capture instructions, such as generating and storing a single image, a specified number of images, or a given duration of video.

The camera data is transmitted to the Camera Data Secure Storage shown in FIGS. 7 and 8, which can be implemented as a database on a network computing device. Prior to storing the camera data, the camera data can be optionally be processed to append relevant data either by the DIWA software application or by a remote software application hosted on the provider network. As an example, the camera data can optionally be associated with a tag clip identifier that designates a shared experience that was ongoing when the camera data was generated. The camera data can also be associated with machine labels, such as event data identifying the end user computing device, a customer identifier, or a provider client or line of business identifier, among other types of data and information.

Figure 9:
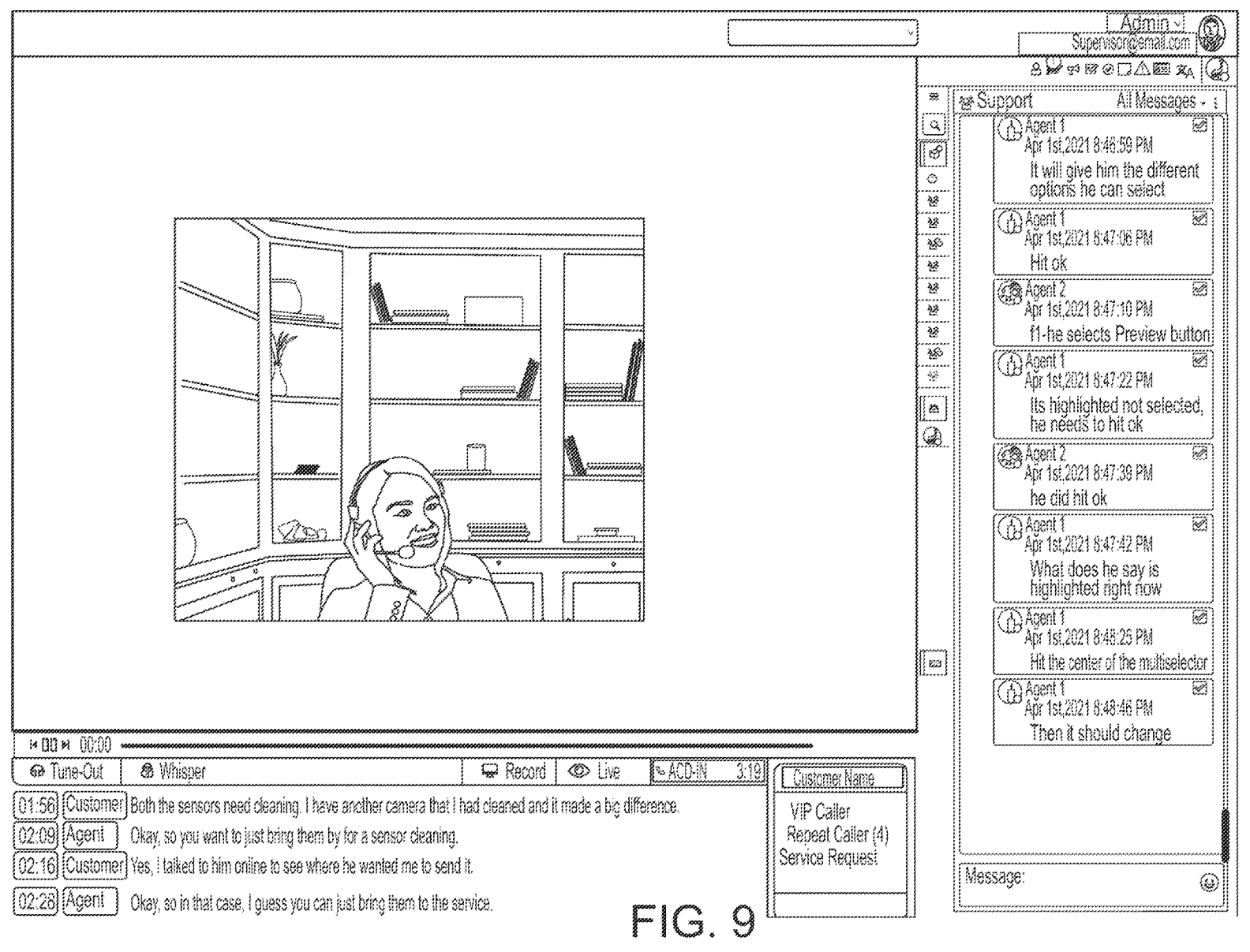

For camera data that includes video or a series of images that can be played as a video, time codes can be applied to the camera data to facilitate review of the camera data in a video playback software application according to time frames. An example Camera Review user interface is depicted in FIG. 9 that shows an example image of an end user generated by an end user computing device camera. The Camera Review user interface can also display other information relevant to a shared experience, such as a transcript of audio data generated during the shared experience, as depicted below the image shown in FIG. 9. In some embodiments, the supervisor end user computing device is equipped with multiple monitors so that the Camera Review interface can be displayed simultaneously with other interfaces, such as the AWS Intelligent Monitor interface and the Shared Experience Review interface. Thus, the supervisor end user computing device can teleport into an agent's work environment and have access to the agent computing device desktop display, the agent's ongoing call with customer, and a view of the agent's physical surroundings.

The camera data is retrieved from Camera Data Secure Storage by the Image Orchestration API software application and transmitted to the Video & Image Recognition software for processing and analysis. The camera data can be processed according to rules and techniques established by the provider. To illustrate, a provider may establish policies that prohibit end users from utilizing portable computing devices (e.g., a smartphone or tablet) during a shared experience to prevent end users from taking pictures of sensitive information displayed by the end user computing device. Or a provider can establish policies that prohibit the presence of third parties in an end user's work environment to control the potential dissemination of sensitive information discussed during a telephone call as part of a shared experience. Thus, the camera data can be analyzed to detect the presence of multiple persons or portable computing devices in the end user's work environment.

In other cases, the camera data can be compared against known camera data or image data stored to the provider's system to authenticate an end user or the end user's work environment. Authenticating an end user's image can detect risks such as unauthorized use of an end user's credentials (e.g., through theft of the credentials or two end users attempting to trading a work shift without approval). Authentication of an end user's environment finds particular utility in a remote work setting where an end user may attempt to work from an unsecure location where third parties or recording devices may be present (e.g., working from a coffee shop instead of home, etc.). To authenticate an end user or the end user's work environment, the provider's system stores a known reference image of the end user or the work environment. Camera data generated during a shared experience is compared against the known reference images to identify the end user or detect changes in the end user's work environment. If the camera data does not match the known reference image, it indicates the occurrence of a potential compliance violation.

Following analysis of the camera data, the Video & Image Recognition software returns image analysis results data to the Image Orchestration API software application for storage to the Camera Data Secure Storage. If a compliance violation is detected, the Image Orchestration API generates a camera alert event that is passed to the Foundational Analytics Data Pipeline (i.e., the foundational analytics system) and the Adaptive Workspace software code. The Adaptive Workspace software code processes the camera alert event and generates an alert that is displayed on the AWS Intelligent Monitor interface of a supervisor end user computing device, such as changing the color of an agent tile. The supervisor end user computing device can then navigate to the Camera Review interface to review the camera data and begin investigating the possible compliance violation.

OneTeam Agent Technology Framework

The OneTeam Agent technology framework, the components of which are shown in FIG. 7, enables robust, universal authentication and network access control capabilities for providers and networks having a variety of computing device and user account types. The OneTeam Agent technology framework authenticates end user computing devices and determines whether the end user computing devices have the appropriate resources to reliably and securely access a provider network. Once authenticated, the OneTeam Agent technology framework configures the end user computing device with the software tools necessary for end users to accomplish designated job functions.

Accommodating a multitude of computing device and end user account types presents significant challenges for providers that are required to implement more than one method of authentication. Having multiple methods for authentication becomes burdensome for both end users and providers that must maintain different security systems and protocols. Once authenticated, the computing devices must be appropriately configured to ensure the proper software applications are installed and updated. Conventional technology for configuring end user computing devices, such as Group Policy Objects, are unreliable particularly for networks where end users are working remotely and network connection quality varies among users.

The challenges faced by providers when authenticating multiple computing device types is illustrated with the following simplified examples. In some cases, end users rely on a provider-issued computing device to access a provider network, but in other cases, end users rely on a personally owned computing device. Provider-issued computing devices are configured to require provider-issued authentication credentials (i.e., a username and password) to log into the device and are configured with security features, like stored security keys known to the provider. Such features facilitate accurate, expedient authentication and network access control. However, personally-owned computing devices may require authentication credentials that are unknown to the provider, and such devices may lack the appropriate software and security features for authentication to a provider's network. Moreover, provider- or personally-owned computing devices may lack the appropriate system resources, such as processing speed, memory, storage, or network connection quality, to run required software and to ensure reliable access to a provider network.

As another example, some end users access a provider network using generic authentication credentials that are not unique to the end user, and as a result, verifying end user identity cannot be readily accomplished by looking up a username. Further, in some circumstances, different categories of end users access a provider network using different software applications that require customized software features to interface with a provider's network. Some end users working in a provider's office on a personal computer might access a provider network through an Internet browser login portal webpage while other end users working in the field utilize a mobile software application installed on a mobile device. The provider is, therefore, required to implement and maintain multiple methods for controlling access to its network by end users having different device types and software configurations. The foregoing examples are just a few of the numerous configurations that providers might face when attempting to control access to a network and ensure end user computing devices are properly configured.

The OneTeam Agent technology framework allows providers to accommodate a broad range of circumstances when authenticating end users and managing access to a network. The OneTeam Agent technology framework utilizes a OneTeam Agent ("OT Agent") software application that is pre-installed on end user computing devices as an operating system service. The OT Agent software application facilitates a process that captures and generates a wide variety of data and information that is used to authenticate end user computing devices, determine end user computing device configuration, and control access to a provider network. That is, unlike conventional methods for logging into a network that rely on limited information—such as a username that may not be unique to an end user or known to a provider—the OneTeam Agent technology framework generates a more complete picture of end users that is used to definitively identify end users, control access to a network, and configure end user computing devices.

The OT Agent software application is pre-installed on the end user computing device and runs in the background without the need for end user input. When the end user computing device is powered on and the end user logs into the computing device, the OT Agent software application automatically performs an initial machine software inventory check. The initial machine software inventory check analyzes the end user computing device to detect the presence an initial suite of machine software applications and to determine the current version of the initial machine software applications (if the software applications are installed). The initial machine software applications shown in FIG. 7 includes: (i) the Digital Insight Endpoint Analytics ("DI Endpoint Analytics") software application; (ii) the Visualware NQCS.exe ("Visualware") software application; and (iii) the Digital Insights Identity & Location ("DI Identity") software application.

Following the initial machine software inventory check, the OT Agent software application transmits initial machine software inventory data to the Software Inventory Database API software application. The Software Inventory Database API is hosted on a remote computing device operated by the provider and is designed to interface with a software inventory database that maintains updated software applications for download by the end user computing devices.

The initial machine software inventory data sent to the Software Inventory Database API includes a machine software indicator for each of the initial machine software applications installed on the end user computing device as well as version data representing the version of the initial machine software applications that are installed. The Software Inventory Database API performs an initial configuration analysis by analyzing the initial software installation data to determine whether any of the required initial machine software applications are not installed on the end user computing device, or if any of the initial machine software applications must be updated. The initial configuration analysis can retrieve a required list of initial machine software applications and compare the required list against the machine software indicators received from the end user computing device.

If any of the required initial machine software applications are not installed, or if the end user computing device is not running the most current versions of the initial machine software applications, the Software Inventory Database API transmits the most current version of the initial machine software applications to the end user computing device. By first performing a check for the initial machine software applications and only downloading the initial machine software applications the end user computing device requires, the OT Agent software application efficiently commences the process of configuring the end user computing device while conserving connection bandwidth, thereby allowing the system to perform even when network connection quality is degraded.

The initial machine software applications commence the process of authenticating the end user computing device, determining the identity of the end user, and managing access to the provider network. The initial machine software applications is unsecured such that the initial machine software applications do not include sensitive provider data or allow access to the provider network until the end user identity is confirm, the end user computing device is authenticated, and/or the end user computing device is confirmed to have sufficient computing resources. Once the end user computing device is authenticated, the end user identity is determined, and/or access to sufficient computing resources is confirmed, the DI Launcher software application initiates the process of configuring the end user computing device with the appropriate operational software applications, as discussed in more detail below.

As part of evaluating access to sufficient resources, the Visualware software application performs a connection quality test that analyzes the end user computing device network or Internet connection to ensure that the end user computing device has adequate bandwidth and connection speed to reliably and securely access the provider network. At or around the time an end user logs into the end user computing device, the Visualware software application will send a network test request message to the My Connection Server ("MCS"). The MCS will respond by transmitting a connection test file to the Visualware software application (i.e., the Visualware software application will download the connection test file). The Visualware software application then transmits the connection test file back to the MCS. In this manner, both the download and upload speeds for the end user computing device are determined. The connection quality test can include performing a test of Voice over Internet Protocol ("VoIP") transmission speeds, which ensures proper functionality of VTI/CTI software applications utilized during a shared experience. The results of the network connection tests are referred to herein as connection quality data. Referring to FIG. 7, the connection quality data is stored to the OTA Secure Storage as Access Control Data for use by the Access Enrichment Ruleset software application.

The DI Endpoint Analytics software application performs one or more computing resource analyses that generates device resource data relating to the use and availability of end user computing device computing resources, such as processor, memory, storage, and network utilization. The device resource data can include a variety of metrics, such as: (i) a percentage of processor capacity utilized by the end user computing device; (ii) the amount of volatile memory available (i.e., Random Access Memory or "RAM") in megabytes or gigabytes; (iii) the percentage of available volatile memory currently utilized by the end user computing device; (iv) the volume of available storage (i.e., hard drive space); (v) the input/output performance in operations per second ("TOPS") of the storage device integrated with the end user computing device; (vi) the network connection speed as measured in bytes per second; or (vii) other performance metrics useful to a provider in monitoring computing device and network functionality. The DI Endpoint Analytics software application performs a computing resource analysis at the time an end user computing devices attempts to access a provider network and periodically thereafter while the end user computing device is in operation.

The DI Endpoint Analytics software application transmits the device resource data to the Endpoint Analytics API running on the provider system. The Endpoint Analytics API stores the device resource data to the OTA Secure Storage as Access Control Data. The Access Enrichment Ruleset software application can enrich the device resource data by associating the device resource data with information that identifies the end user or with SAPL data. The Endpoint Analytics API formats the enriched device resource data for display to provider personnel who utilize the device resource data to control access to the provider network, trouble shoot problems with the provider network, render technical support to end users, or analyze provider technology performance, among other uses.

The DI Identity software application analyzes the end user computing device and captures endpoint authentication data. The endpoint authentication data includes, but is not limited to: (i) a machine login username, which is a username the end user entered to log into the end user computing device; (ii) the end user computing device Internet Protocol address ("IP Address"); (iii) virtual private network data ("VPN data"), which can be captured from a log file stored to the end user computing device when an end user computing device accesses a provider's network through a VPN; (iv) a user.json file that is stored by a provider system to an end user computing device during access to the provider network and that may include a GUID and other identifying information; (v) a media access control ("MAC") address ("end user device MAC data") hardcoded into the communication subsystem of the end user computing device); (vi) a MAC address for the local network of an end user computing device, such as a router MAC address ("network MAC data"); (vii) domain connection data that identifies the domain, if any, to which the end user computing device is connected; (viii) copies of key system files; (ix) a list of applications installed on the end user computing device ("local file inventory data"); (x) machine name data; and (xi) any other data useful for authenticating the end user computing device.

The DI Identity software application transmits the end user computing device IP Address to the Identity & Location API that utilizes the IP Address to determine the approximate geographic location of the end user computing device. The Identity & Location API can pass the IP Address to a database or a third-party software service that returns geographic IP data corresponding to an approximate geographic location for the IP Address, such as a city, county, or state. The Identity & Location API stores the geographic IP data to the OTA Secure Storage as Access Control Data.

The Access Enrichment Ruleset software application performs an identity analysis that analyzes the Access Control Data as well as data from other sources to identify and authenticate an end user and/or an end user computing device that is attempting to access the provider network. The Access Enrichment Ruleset software application also performs a resource availability analysis to determine whether the end user computing device has sufficient computing resources (e.g., processing speed, storage availability) to connect to and operate within a provider network and download the required operational software applications.

In one embodiment, the results of the analyses performed by the Access Enrichment Ruleset software application are used to grant or deny access to the provider network. For instance, the Access Enrichment Ruleset software application can be configured to generate an access notification message or event data indicating whether access to the provider network should be granted or denied based on the results of the identity analysis and resource availability analysis. As an example, if access should be granted, the access notification can be set to a value of "permitted" or "granted." On the other hand, if access should be denied, the access notification can be set to a value of "denied." The access notice can be transmitted to the end user computing device for display of an alert indicating the grant or denial and/or to initiate the process of installing required operational software applications.

The Access Enrichment Ruleset software application can be implemented as a rule-based software engine that processes the Access Control Data to provide authentication and access control functionality. The Access Enrichment Ruleset software application continuously processes the Access Control Data as it is generated so that the authentication and access control processes are dynamic rather than a static, sequential application of predetermined steps. The Access Enrichment Ruleset software application can also be configured to prioritize analysis of the available Access Control Data according to predefined criteria, such as first analyzing the most reliable indicator of authenticity before moving on to the next most reliable indicator.

Figure 10:
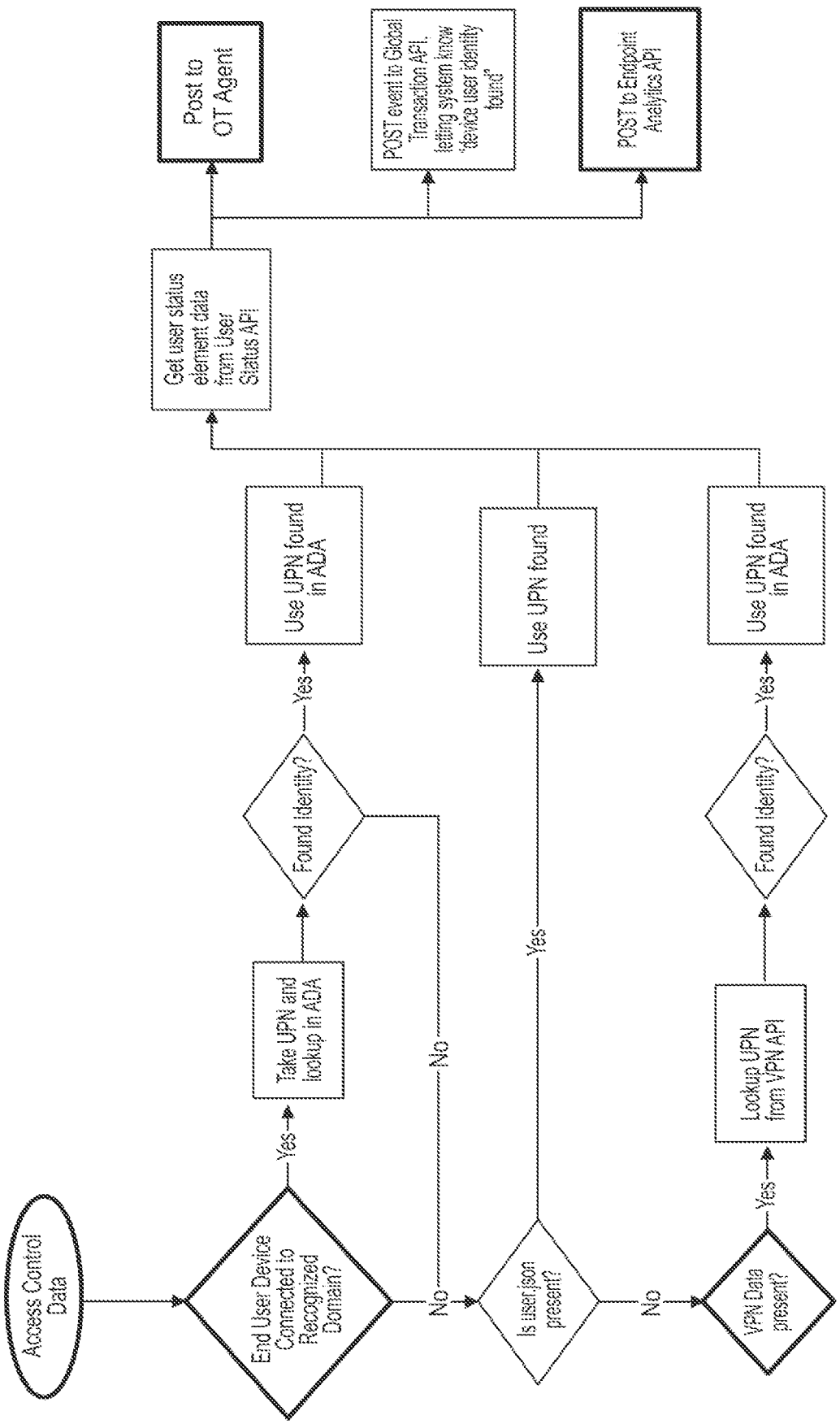
FIG. 10 illustrates example steps taken by the Access Enrichment Ruleset software application.

Operation of the Access Enrichment Ruleset software application is illustrated by the simplified example shown in FIG. 10 with reference to the system embodiment shown in FIG. 7. The Access Enrichment Ruleset software application first analyzes domain connection data included in the Access Control Data to determine if the end user computing device is connected to a known network domain. If so, the Access Enrichment Ruleset software application can query the end user computing device to provide a UPN or analyze the Access Control Data to determine the presence of a UPN.

The Access Enrichment Ruleset software application transmits the UPN to the Active Directory Administrative API ("ADA API") software application shown in FIG. 7 to confirm the identity of the end user and end user computing device. The ADA API provides an interface to an active directory service, which is an identity management service that includes an ADA Database associating each end user with a predefined set of permissions, attributes, and identifying information.

In some embodiments, the ADA API can be configured to return end user attribute data that includes, without limitation, information relating to an end user's location and work experience and that defines permissions, such as the provider clients, client products and service (i.e., line of business or "LOB"), and job functions that an end user is authorized to access or perform. The Access Enrichment Ruleset software application also queries the User Status API shown in FIG. 7, which also can serve as an end user active directory database. The User Status API returns end user attribute data, such as SAPL data. The OneTeam Agent Technology framework can utilize a separate ADA API and a User Status API, or one or the other API can serve as an end user active directory database to provide end user attribute data. By incorporating end user attribute data, the OneTeam Agent technology framework not only authenticates the end user computing device, but the OneTeam Agent technology framework fully identifies the end user and defines the end user's role and permissions on a provider network.

Turning again to FIG. 10, once an end user computing device is authenticated and the end user attribute data is provided by the ADA API or the User Status API, the Access Enrichment Ruleset software application notifies other OneTeam Agent technology components that the authentication was successful and makes the end user attribute data available to other system components by storing the data to the OTA Secure Storage. In particular, the Access Enrichment Ruleset software application generates event data indicating that the end user computing device was identified and sends the event data to the GTI API component of the Foundational Analytics Data Pipeline. The event data can be transmitted to the OT Agent software application and the Endpoint Analytics API, or the Access Enrichment Ruleset software application can generate a separate access notification message that is transmitted to OT Agent software application and the Endpoint Analytics API.

With reference to FIG. 10, if the end user computing device is not connected to a recognized domain, the Access Enrichment Ruleset software application moves on to the next most reliable indicator of authentication by analyzing the Access Control Data to determine the presence of a user.json file. The presence of the user.json file suggests that the end user computing device previously authenticated to the provider system. Thus, the user.json file is a less reliable indicator than the end user computing device being currently connected to a recognized domain. But the user.json file nonetheless tends to indicate that the end user is authorized to access the provider network since such access was previously accomplished.

Additionally, the user.json file can include valuable identification data useful for authentication, such as end user computing device machine name data, a GUID, an UPN, and end user attribute data. In the example embodiment shown in FIG. 10, the UPN obtained from the user.json file is assumed to be correct, and the user.json file includes sufficient end user attribute data that the Access Enrichment Ruleset software application does not need to query the ADA API.

The Access Enrichment Ruleset software application next retrieves end user attribute data from the User Status API and notifies other OneTeam Agent technology components that the authentication was successful in the manner discussed above. Although not shown in FIG. 10, the Access Enrichment Ruleset software application can optionally perform additional authentication checks, such as comparing end user attribute data obtained from the user.json file against end user attribute data obtained from the ADA API or User Status API.

If the user.json file is not present as part of the Access Control Data, the Access Enrichment Ruleset software application analyzes VPN Data included in the Access Control Data. Similar to the user.json file, the VPN Data can include valuable identification data such as a machine name, an end user UPN, or end user attribute data. Referring to the example process of FIG. 10, the Access Enrichment Ruleset software application retrieves machine name data (or alternatively end user device MAC data) from the VPN Data and utilizes the machine name data to query the VPN API, which returns an end user UPN. The Access Enrichment Ruleset software application utilizes the UPN to retrieve additional end user attribute data from the User Status API. The Access Enrichment Ruleset software application can optionally perform additional authentication checks, such as comparing end user attribute data from the VPN Data to end user attribute data retrieved from the User Status API. Once the end user is identified and/or the end user computing device is authenticated, and the end user attribute data is obtained, the Access Enrichment Ruleset software application generates an access notification that is transmitted to other OneTeam Agent technology components indicating that the authentication was successful.

Those of ordinary skill in the art will appreciate that FIG. 10 is not intended to be limiting, and the Access Enrichment Ruleset software application can be configured to perform a variety of access control checks. The Access Enrichment Ruleset software application can be configured to require that multiple rules must be satisfied before authentication is successful to provide a higher degree of confidence that the end user computing device is authorized to access the provider network. For example, the Access Enrichment Ruleset software application might require not only that the end user UPN be verified by the ADA API but also that the geographic IP data stay within a geographic IP threshold value. Verifying the geographic IP data can mitigate against the risk that stolen authentication credentials are being used from a remote geographic location in an attempt to access the provider network.

Additional authentication checks could include, for example, comparing end user device MAC data, network MAC data, or local file inventory data obtained from the Access Control Data to known values previously stored to the provider's system. Changes to these parameters could indicate that an unknown computing device is attempting to access the provider network. In other embodiments, the Access Enrichment Ruleset software application can initiate a Schedule Based Access ("SBA") check to determine if the end user is scheduled to work at the time access to the provider network is attempted. The Access Enrichment Ruleset software application can perform a SBA check by passing an end user UPN or computing device GUID to a Scheduling API (not shown) that interfaces with an electronic Work Flow Management database (also not shown) to determine whether the end user is scheduled to work at the given time. If the end user is not scheduled to work, access to the provider network can be denied.

The Access Enrichment Ruleset software application can also be configured to perform an endpoint resource analysis that applies rules for controlling access to the provider network that are designed to ensure that the end user computing devices have sufficient computing resources to reliably and securely access and operate within the provider network, including sufficient resources to download and run the specified operational software. The Access Enrichment software application analyzes the Access Control Data to obtain the end user computing device connection quality data and device resource data.

In one example embodiment, the connection quality data and device resource data are compared against predetermined minimum threshold values to determine whether provider network access should be granted or denied. For instance, the Access Enrichment software application may compare device resource data generated by the DI Endpoint Analytics API against one or more device resource threshold values to determine that the end user computing device does not have sufficient storage or volatile memory to install and run one or more required operational software applications. Or the Access Enrichment software application might determine that the connection quality test data does not satisfy a connection quality threshold value such that the network connection quality is too poor to reliable stream audio data or to operate a VIT/CTI software application. In that case, access to the provider network access can be denied, and an access notification is generated having a value of "denied." Alternatively, the system may generate an alert indicating that computing resources are insufficient for the end user computing device to download required operational software, and the end user should seek technical support assistance.

In the event that the end user computing device is successfully authenticated and has sufficient computing resources, the OT Agent software application runs the DI Launcher software process. The DI Launcher analyzes the end user computing device by performing an operational software inventory check to determine whether certain operational software applications are installed that end users require to perform designated job functions and operate within a provider network. If the operational software applications are installed, the operational software inventory check also determines the version of the installed operational software applications.

The DI Launcher transmits operational software inventory data to the DI Software Inventory Database API software application that is hosted on a remote computing device operated by the provider. The operational software inventory data includes an operational software indicator that indicates whether the required operational software applications are installed. The operational software inventory data can include or be accompanied by version data indicating the version of operational software applications installed on the end user computing device. The DI Software Inventory Database API performs an operational software configuration analysis by processing the operational software inventory data and/or version data to determine whether any of the operational software applications are installed on the end user computing device or if any of the operational software applications are out of date.

The operational software configuration analysis also processes end user attribute data received either from the end user computing device or the provider network (e.g., from the OTA Secure Storage or the ADA API) as part of the identity analysis performed by the Access Enrichment Ruleset software application. By processing the end user attribute data, the DI Software Inventory Database API determines whether the proper operational software applications are installed for a given end user considering the site, account, program, line of business, and client served by the end user. That is, end users serving different clients or providing customer service for different products may require access to different software applications and digital resources. Thus, a provider can customize the operational software installed on the end user computing device for various end users.

Customizing the installed software applications for end user computing devices allows providers to efficiently manage network resources by ensuring the end user computing devices download and install only those operational software applications the end user requires to perform designated job functions. Customization also facilitates security by preventing end users from accessing operational software applications that would otherwise provide end user computing devices with access to information and network resources that are beyond the end user permissions, such as unauthorized sites, accounts, programs, lines of business, or clients.

Following the operational configuration analysis, if the DI Software Inventory Database API determines that any of the operational software applications are not installed or are out of date, the Software Inventory Database API transmits the most current version of the operational software applications to the end user computing device. Significantly, this functionality not only facilitates efficient use of network resources and security, but it also allows providers to distribute software application updates or new software applications required by a provider.

As shown in the example system embodiment of FIG. 7, operational software applications can include, without limitation: (i) a Login GUI that provides end users with a portal to log into a provider network; (ii) the Agent Desktop DIAVA Client software application that captures audio data, video data, and end user screen data for transmission to the DIAVA Hub or the DVR API; (iii) a Whiteboard software application, which provides word processing functionality; (iv) a DI Chrome Native Host ("Chrome Host"), which is responsible for bridging communication between a Chrome® Internet browser software application and the end user computing device operating system; (v) the DI Launcher software application that manages installation and updating of operational software applications; (vi) the DIWA software application that manages the generation, capture, and transmission of camera data; (vii) the DI Desktop Agent ("DIDA") software application that captures event data and activity on the end user computing device desktop; and (viii) the DI WatchMode Chrome extension ("Chrome Watchmode"), which is a software extension that is responsible for capturing events within the Chrome® Internet browser software application and then using the DI Chrome Native Host as a proxy to send events to the provider system.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A computer implemented method for monitoring end users comprising the operations of:
   (a) receiving by a Digital Video Recorder Application Program Interface (DVR API) end user screen data and audio data transmitted by a target end user computing device, wherein the DVR API stores end user screen data and the audio data to memory as stored DVR data;
   (b) generating by Adaptive Workspace software code, an AWS Intelligent Monitor interface that is displayed on a first end user computing device, wherein the AWS Intelligent Monitor interface comprises a screen function and a Live function;
   (c) selecting by a first end user, the screen function to transmit
      (i) a screen and audio data request message to a DIAVA Hub running on a remote network computing device, wherein (A) the DIAVA Hub transmits a screen share command and an audio stream command to the target end user computing device, (B) the DIAVA Hub receives streaming end user screen data captured by an Agent Desktop DIAVA Client software application running on the target end user computing device, and (C) the DIAVA Hub is configured to transmit the streaming end user screen data to one or more end user computing devices, and
      (ii) a DVR data request message to the DVR API, which returns stored DVR data to the first end user computing device;
   (d) receiving by the Adaptive Workspace software code, stored DVR data from the DVI API and streaming end user screen data from the DIAVA Hub;
   (e) receiving by the Adaptive Workspace software code from a live stream software service running on a remote computing device, audio data captured by the Agent Desktop DIAVA Client software application;
   (f) outputting the stored DVR data to the AWS Intelligent Monitor interface; and
   (g) selecting the Live function by the first end user to output by the first end user computing device, both the streaming end user screen data and the audio data so that the audio data is audible to the first end user.

2. The computer implemented method for monitoring end users of claim 1, wherein:
   (a) the AWS Intelligent Monitor interface further comprises a second, third, fourth, fifth, and sixth screen function that are each selected by the first end user; and wherein
   (b) selecting the second, third, fourth, fifth, and sixth screen functions transmits a second, third, fourth, fifth, and sixth screen and audio data request message to the DIAVA Hub, wherein each of the screen and audio data request messages comprises a distinct target end user computing device identifier that is used by the DIAVA Hub to transmit a second, third, fourth, fifth, and sixth screen share command to corresponding second, third, fourth, fifth, and sixth target end user computing devices;
   (c) receiving by the Adaptive Workspace software code, streaming end user screen data captured by a second, third, fourth, fifth, and sixth Agent Desktop DIAVA Client software application running on the corresponding second, third, fourth, fifth, and sixth target end user computing devices; and
   (d) displaying on the AWS Intelligent Monitor interface, the streaming end user screen data for each of the corresponding second, third, fourth, fifth, and sixth target end user computing devices, wherein
      (i) the AWS Intelligent Monitor interface further comprises six agent blackboards configured to display streaming end user screen data, and
      (ii) each of the six agent blackboards simultaneously displays streaming end user screen data from a different target end user computing device.

3. The computer implemented method for monitoring end users of claim 1, wherein:
   (a) The live stream software service transmits to two or more agent computing device the audio data captured by the Agent Desktop DIAVA Client software application; and
   (b) and each of the two or more agent computing devices outputs the audio data so that the audio data is audible to an agent computing device end user.

4. The computer implemented method for monitoring end users of claim 1, wherein the Agent Desktop DIAVA Client software application captures the audio data from a data port integrated with the target end user computing device.

5. The computer implemented method for monitoring end users of claim 4, wherein:
   (a) the data port is a universal serial bus port; and
   (b) the audio data is generated by a computer telephony interface software application integrated with the target end user computing device.

6. The computer implemented method for monitoring end users of claim 1, wherein:
   (a) the target end user computing device is connected to (i) a speaker device comprising a speaker right channel and a speaker left channel, and (ii) coupled to a first microphone device comprising a first microphone right channel and a first microphone left channel;
   (b) the first end user computing device is connected to a second microphone comprising a second microphone right channel and a second microphone device left channel; and wherein
      (i) when audio data is generated by the target end user speaking into the first microphone device, the audio data is transmitted to the Live Stream software service through only the first microphone device right channel or the first microphone device left channel, and
      (ii) when audio data is generated by the first end user speaking into the first microphone device, the audio data is transmitted to the DIAVA Hub through only the second microphone right channel or the second microphone left channel, (iii) when audio data generated by the first end user speaking into the first microphone device, the audio data is output to the target end user speaker device through only the speaker right channel or the speaker left channel, and (iv) when audio data generated by a remote person speaking, the audio data is output to the target end user speaker device through only the speaker right channel or the speaker left channel that is the oppose of the speaker channel that outputs the audio data generated by the first end user.

7. The computer implemented method for monitoring end users of claim 1, wherein:

(a) the AWS Intelligent Monitor interface further comprises a whisper function; and (b) selecting the whisper function transmits audio data from the first end user computing device, wherein (i) the audio data is generated by the first end user speaking into a first end user microphone device connected to the first end user computing device, (ii) the audio data is transmitted through a single audio data channel of the first end user microphone device, and (iii) the audio data is received by a single audio data channel of a speaker device connected to the target computing device.

8. A computer implemented method for monitoring system end users comprising the operations of:

(a) transmitting by a first end user computing device, a request to listen message to a DIAVA Hub, wherein the request to listen message comprises a target end user computing device identifier;

(b) transmitting by the DIAVA Hub, an audio stream command to a target end user computing device using the target end user computing device identifier;

(c) capturing by an Agent Desktop DIAVA Client software application, in response to the audio stream command, audio data from a data port integrated with the target end user computing device;

(d) separating by the Agent Desktop DIAVA Client software application, the audio data into (i) a right audio data channel comprising target end user audio data generated by a target end user speaking into a target end user microphone device connected to the target end user computing device, and (ii) a left audio data channel comprising remote person audio data that is (A) fed to a target end user speaker device connected to the target end user computing device, and (B) generated by a remote person speaking, (e) at the time audio data is generated by a target end user or a remote person, transmitting the generated audio data, by the target end user computing device, to a live stream service, wherein (i) the target end user audio data is transmitted through the right audio data channel, and (ii) the remote person audio data is transmitted through the left audio data channel;

(f) transmitting by live stream service, the target end user audio data and the remote person audio data, to the first end user computing device, wherein (i) the target end user audio data is transmitted to a first end user speaker device right channel, and (ii) the remote person audio data is transmitted to a first end user speaker device left channel.

9. The computer implemented method for monitoring end users of claim 8 further comprising the operation of transmitting new audio data from the first end user computing device to the target end user computing device, wherein:

(a) the new audio data is generated by the first end user speaking into a first end user microphone device connected to the first end user computing device;

(b) the new audio data is transmitted through a single audio data channel of the first end user microphone device, and (c) the audio data is received by a single audio data channel of a speaker device connected to the target computing device.

* * * * *